US011156773B2

(12) United States Patent
Lu et al.

(10) Patent No.: US 11,156,773 B2
(45) Date of Patent: Oct. 26, 2021

(54) WAFER-LEVEL HANDLE REPLACEMENT PROCESSING

(71) Applicant: Ayar Labs, Inc., Santa Clara, CA (US)

(72) Inventors: Haiwei Lu, San Jose, CA (US); Chen Li, San Jose, CA (US); John Fini, Oakland, CA (US); Chong Zhang, San Jose, CA (US); Roy Edward Meade, Lafayette, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 17/019,158

(22) Filed: Sep. 11, 2020

(65) Prior Publication Data

US 2021/0080647 A1 Mar. 18, 2021

Related U.S. Application Data

(60) Provisional application No. 62/899,414, filed on Sep. 12, 2019.

(51) Int. Cl.
*G02B 6/12* (2006.01)
*G02B 6/13* (2006.01)
*G02B 6/293* (2006.01)
*G02F 1/313* (2006.01)

(52) U.S. Cl.
CPC .......... *G02B 6/12007* (2013.01); *G02B 6/13* (2013.01); *G02B 6/29338* (2013.01); *G02B 6/29395* (2013.01); *G02F 1/313* (2013.01); *G02F 2203/15* (2013.01)

(58) Field of Classification Search
CPC .. G02B 6/12007; G02B 6/13; G02B 6/29338; G02B 6/29395; G02B 2006/12135; G02F 2203/15; G02F 1/313
See application file for complete search history.

(56) References Cited

U.S. PATENT DOCUMENTS 7,231,113 B2 * 6/2007 Chu .................... G02B 6/12007
385/16

* cited by examiner

*Primary Examiner* — John Bedtelyon
(74) *Attorney, Agent, or Firm* — Penilla IP, APC

(57) ABSTRACT

A handle-integrated composite wafer assembly includes a handle wafer attached to a device wafer. The device wafer includes a device layer formed on a buried oxide layer. The device layer includes an optical resonator structure. The handle wafer includes a base layer and a layer of anti-reflective material disposed on a top side of the base layer. The base layer has a cavity extending into the base layer from the top side of the base layer. The cavity has at least one side surface and a bottom surface. The layer of anti-reflective material is substantially conformally disposed within the cavity on the at least one side surface and bottom surface of the cavity. The handle wafer is attached to the device wafer with the layer of anti-reflective material affixed to the buried oxide layer, and with the cavity substantially aligned with the optical resonator structure in the device layer.

26 Claims, 21 Drawing Sheets

View (A-A)

View (A-A)

View (B-B)

View (B-B)

(View A-A)

(View B-B)

(View B-B)

View (B-B)

View (A-A)

View (B-B)

View (B-B)

View (B-B)

WAFER-LEVEL HANDLE REPLACEMENT PROCESSING

CLAIM OF PRIORITY

This application claims priority under 35 U.S.C. 119(e) to U.S. Provisional Patent Application No. 62/899,414, filed on Sep. 12, 2019, the disclosure of which is incorporated herein by reference in its entirety for all purposes.

BACKGROUND

Optical data communication systems operate by modulating laser light to encode digital data patterns. The modulated laser light is transmitted through an optical data network from a sending node to a receiving node. The modulated laser light that arrives at the receiving node is de-modulated to obtain the original digital data patterns. Modulation of the laser light is dependent upon having an ability to tune a resonance wavelength of an optical modulator to align with the wavelength of the laser light. In some optical data communication systems, the resonance wavelength of the optical modulator is thermally tuned. It is desirable to thermally tune the resonance wavelength of the optical modulator as efficiently as possible with regard to power consumption and without disrupting the thermal performance of other devices within a vicinity of the optical modulator. It is within this context that the present invention arises.

SUMMARY

In an example embodiment, a handle-integrated composite wafer assembly is disclosed. The handle-integrated composite wafer assembly includes a device wafer and a handle wafer. The device wafer includes a device layer formed on a buried oxide layer. The device layer includes an optical resonator structure. The handle wafer includes a base layer and a layer of anti-reflective material disposed on a top side of the base layer. The base layer has a cavity extending into the base layer from the top side of the base layer. The cavity has at least one side surface and a bottom surface. The layer of anti-reflective material is substantially conformally disposed within the cavity on the at least one side surface of the cavity and on the bottom surface of the cavity. The handle wafer is attached to the device wafer with the layer of anti-reflective material affixed to the buried oxide layer, and with the cavity substantially aligned with the optical resonator structure in the device layer.

In an example embodiment, a method is disclosed for manufacturing a handle-integrated composite wafer assembly. The method includes having a device wafer that includes a device layer formed on a buried oxide layer. The device layer includes an optical resonator structure. The method also includes having a base layer of a handle wafer. The method also includes forming a cavity in the base layer. The cavity is positioned on the base layer to substantially align with the optical resonator structure when the handle wafer is attached to the device wafer. The cavity is also formed to have at least one side surface and a bottom surface. The method also includes disposing a layer of anti-reflective material on the base layer. The layer of anti-reflective material is substantially conformally disposed within the cavity on the at least one side surface of the cavity and on the bottom surface of the cavity. The method also includes attaching the handle wafer to the device wafer so that the layer of anti-reflective material is affixed to the buried oxide layer, and so that the cavity is substantially aligned with the optical resonator structure.

In an example embodiment, a handle-integrated composite wafer assembly is disclosed. The handle-integrated composite wafer assembly includes a device wafer that includes a device layer formed on a buried oxide layer. The device layer includes an optical resonator structure. The handle-integrated composite wafer assembly also includes a handle wafer that includes a base layer and a layer of anti-reflective material disposed on the base layer. The handle wafer includes a layer of patterned spacing material formed on the layer of anti-reflective material. The layer of patterned spacing material is formed to include an opening that exposes a portion of the layer of anti-reflective material. The handle wafer is attached to the device wafer, with the layer of patterned spacing material affixed to the buried oxide layer, and with the opening in the layer of patterned spacing material substantially aligned with the optical resonator structure in the device layer.

In an example embodiment, a method is disclosed for manufacturing a handle-integrated composite wafer assembly. The method includes having a device wafer that includes a device layer formed on a buried oxide layer. The device layer includes an optical resonator structure. The method also includes having a handle wafer that includes a base layer. The method also includes disposing a layer of anti-reflective material on the base layer. The method also includes disposing a layer of spacing material on the layer of anti-reflective material. The method also includes patterning the layer of spacing material to include an opening that exposes a portion of the layer of anti-reflective material. The opening is positioned to substantially align with the optical resonator structure when the handle wafer is attached to the device wafer. The method also includes attaching the handle wafer to the device wafer so that the layer of spacing material is affixed to the buried oxide layer, and so that the opening in the layer of spacing material is substantially aligned with the optical resonator structure.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
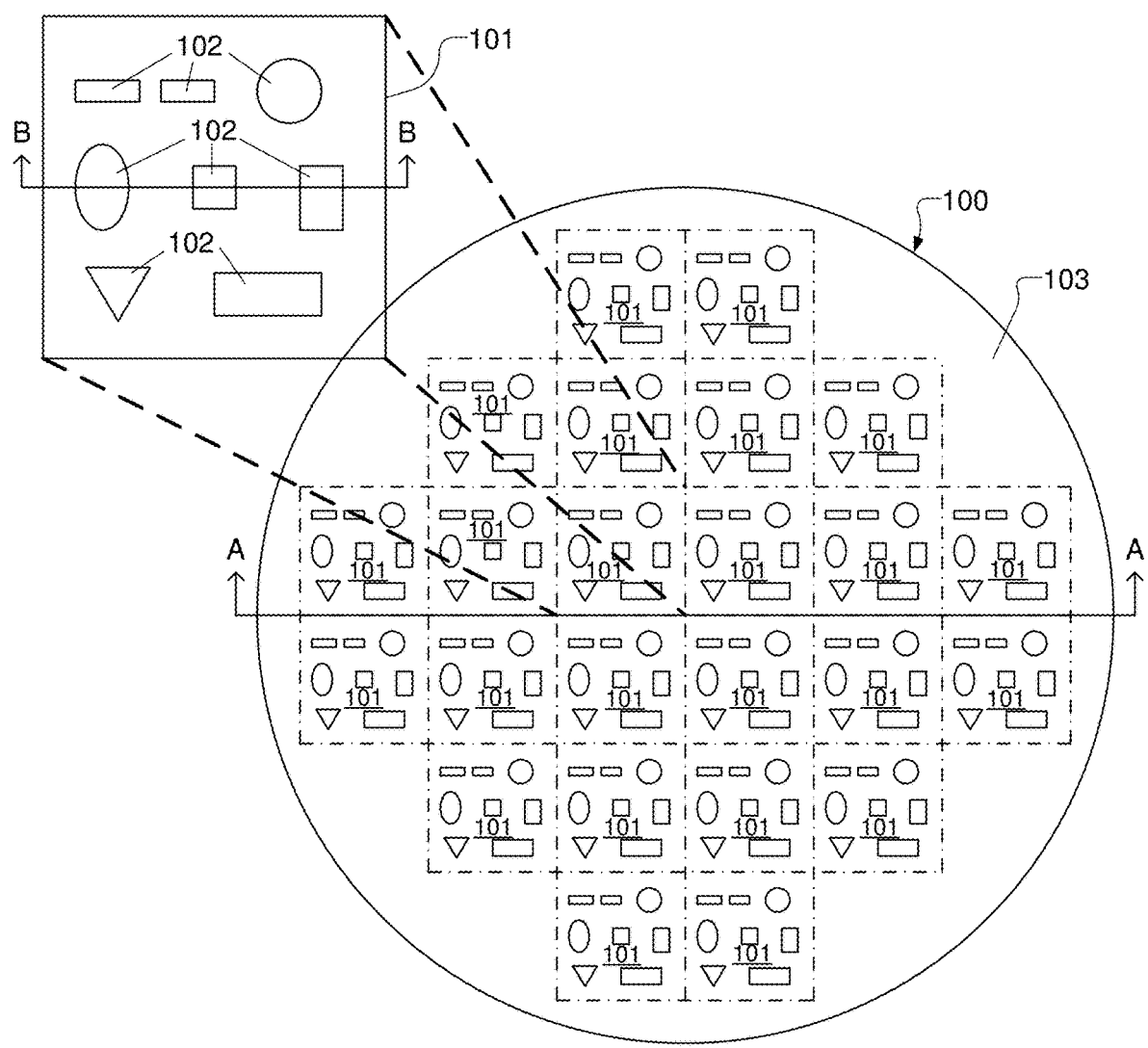
FIG. 1A shows a top view of a device wafer that includes a number of die, in accordance with some embodiments.
Figure 1B:
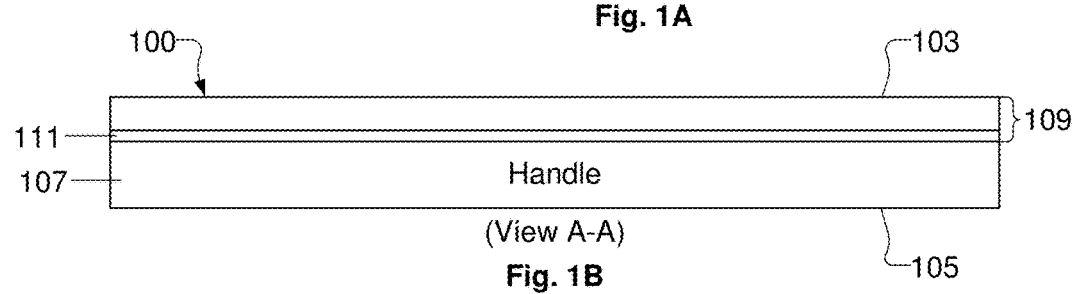
FIG. 1B shows a vertical cross-section view of the device wafer, referenced as View A-A in FIG. 1A, in accordance with some embodiments.
Figure 1C:
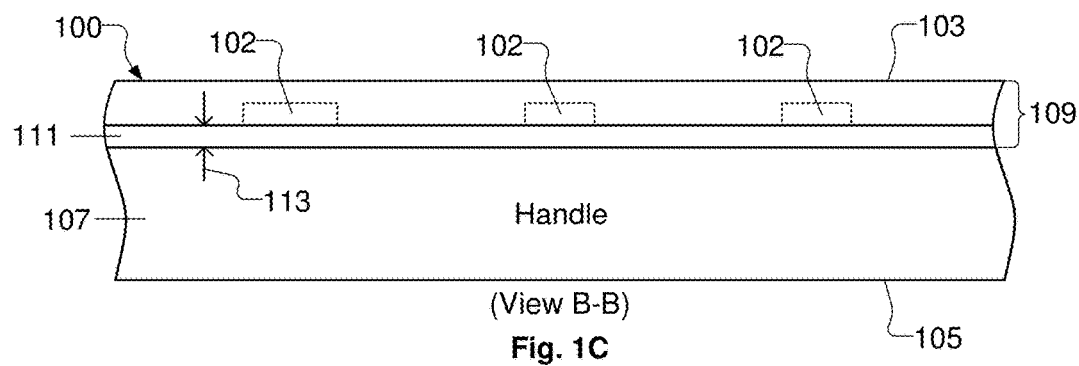
FIG. 1C shows a vertical cross-section view of the die, referenced as View B-B in FIG. 1A, in accordance with some embodiments.

FIG. 1A shows a top view of a device wafer 100 that includes a number of die 101, in accordance with some embodiments. FIG. 1B shows a vertical cross-section view of the device wafer 100, referenced as View A-A in FIG. 1A, in accordance with some embodiments. FIG. 1C shows a vertical cross-section view of the die 101, referenced as View B-B in FIG. 1A, in accordance with some embodiments. It should be understood that the figures described herein are not scale drawings. Various items shown in the figures described herein are sized and/or shaped in the figures to facilitate description. Each die 101 includes electronic integrated circuits and photonic (optical) devices 102. The device wafer 100 has a top surface 103 and a bottom surface 105. It should be understood that the top surface 103 of the device wafer 100 corresponds to the surface of the device wafer 100 on which semiconductor fabrication processes are performed to deposit, remove, modify, and shape various materials to fabricate the die 101. It should be understood that the bottom surface 105 of the device wafer 100 corresponds to the bottom surface of a base layer 107 (handle), e.g., silicon substrate, that extends into the device wafer 100 from the bottom surface 105, with the die 101 fabricated on top of the base layer 107. The device wafer 100 also includes a front region 109 (device layer) that extends into the wafer 100 from the top surface 103. The front region 109 includes the die 101 which are formed to include interlevel dielectric (silicon dioxide, silicon nitride, and/or permutations of silicon dioxide such as SiCOH, etc.), electrical interconnect (e.g., back end of line aluminum, tungsten, and/or copper wires), and semiconductor devices (e.g., silicon body plus Buried Oxide (BOX) for the silicon-on-insulator (SOI) wafer, and/or bulk Complementary Metal-Oxide Semiconductor (CMOS) down to Shallow Trench Isolation (STI) for a bulk CMOS wafer). In some embodiments, the device wafer 100 is an SOI wafer, in which a lower portion of the front region 109 is a BOX layer 111. In some embodiments, the device wafer 100 is a CMOS wafer, and a lower portion of the front region 109 includes an STI region. In some embodiments, the base layer 107 of the device wafer 100 is formed of silicon. In some embodiments, the device wafer 100 is a SOI wafer, and the base layer 107 is the handle silicon located below the BOX material in the lower portion 111 of the front region 109. In some embodiments, the device wafer 100 is a CMOS wafer, and the base layer 107 is the silicon located below the STI structures within the lower portion 111 of the front region 109.

It should be understood that the number and arrangement of die 101 on the device wafer 100 as shown in FIG. 1A is provided by way of example of ease of description. In various embodiments, the size, shape, number, and/or arrangement of die 101 on the device wafer 100 can differ from what is shown in the example of FIG. 1A. Also, it should be understood that the various structures and components depicted in FIG. 1A are not drawn to scale, but rather are depicted to facilitate description. Also, in some embodiments, the device wafer 100 is in a state in which fabrication of the die 101 on the device wafer 100 has been completed.

In some embodiments, silicon photonics waveguides of the photonic devices 102 are formed in the body silicon of SOI wafers that exists within the front region 109 of the device wafer 100 above the BOX layer 111. In some embodiments, when a thickness 113 of the BOX layer 111 in an SOI wafer is less than about 1 micrometer, light propagating in the optical waveguides of the photonic devices 102 can couple to the base layer 107, e.g., to the silicon handle, located below the BOX layer 111. Also, in some embodiments, when a thickness of the STI regions in a CMOS wafer are less than about 1 micrometer, light propagating in body silicon optical waveguides (at or above the STI regions) can adversely couple to the base layer 107 located below the STI regions. In some embodiments, to prevent coupling of light from the photonic devices to the base layer 107, the base layer 107 is replaced to increase the BOX layer 111 thickness 113 to greater than 1 micrometer. In some embodiments, replacement of the base layer 107 is done by implementing a wafer bonding technology for SOI wafer handle replacement.

In some embodiments, some of the photonic devices 102 are resonator devices, such as micro ring resonator (MRR) devices or other types of resonator devices, that include circuitous optical cavities. In some embodiments, a given photonic device 102 includes a resonator device as a component of a modulator. For example, the MRR can be used as a modulator in a silicon photonics device 102 to achieve high light modulation speed with very low energy consumption. Optical cavities are used in a variety of applications in optical data communications systems, including in applications such as lasers, optical modulators, optical splitters, optical routers, optical switches, and optical detectors. Optical cavities may show strong wavelength selectivity, and are frequently used in systems that rely on multiple optical signals transmitting information at different wavelengths. Ring/disc resonator devices, in particular, enable configurations in which light that is coupled from an input optical waveguide into the optical cavity of the ring/disc resonator device is efficiently routed to a separate output optical waveguide, or else is absorbed within the ring/disc resonator device at specific wavelengths. Ring/disc resonator devices may also be used in sensing applications, such as in biological or chemical sensing applications, where a high concentration of optical power is needed in a small area.

It should be understood that the term "wavelength" as used herein refers to the wavelength of electromagnetic radiation. And, the term "light" as used herein refers to electromagnetic radiation within a portion of the electromagnetic spectrum that is usable by optical data communication systems. In some embodiments, the portion of the electromagnetic spectrum includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum.

Also, the term "laser" or "laser beam" as used herein refers to a beam of continuous wave (CW) light generated by a laser device. It should be understood that a laser beam may be confined to propagate in an optical waveguide, such as (but not limited to) an optical fiber or an optical waveguide within a planar lightwave circuit (PLC). In some embodiments, the laser beam is polarized. And, in some embodiments, the light of a given laser beam has a single wavelength, where the single wavelength can refer to either essentially one wavelength or can refer to a narrow band of wavelengths that can be identified and processed by an optical data communication system as if it were a single wavelength.

Figure 2A:
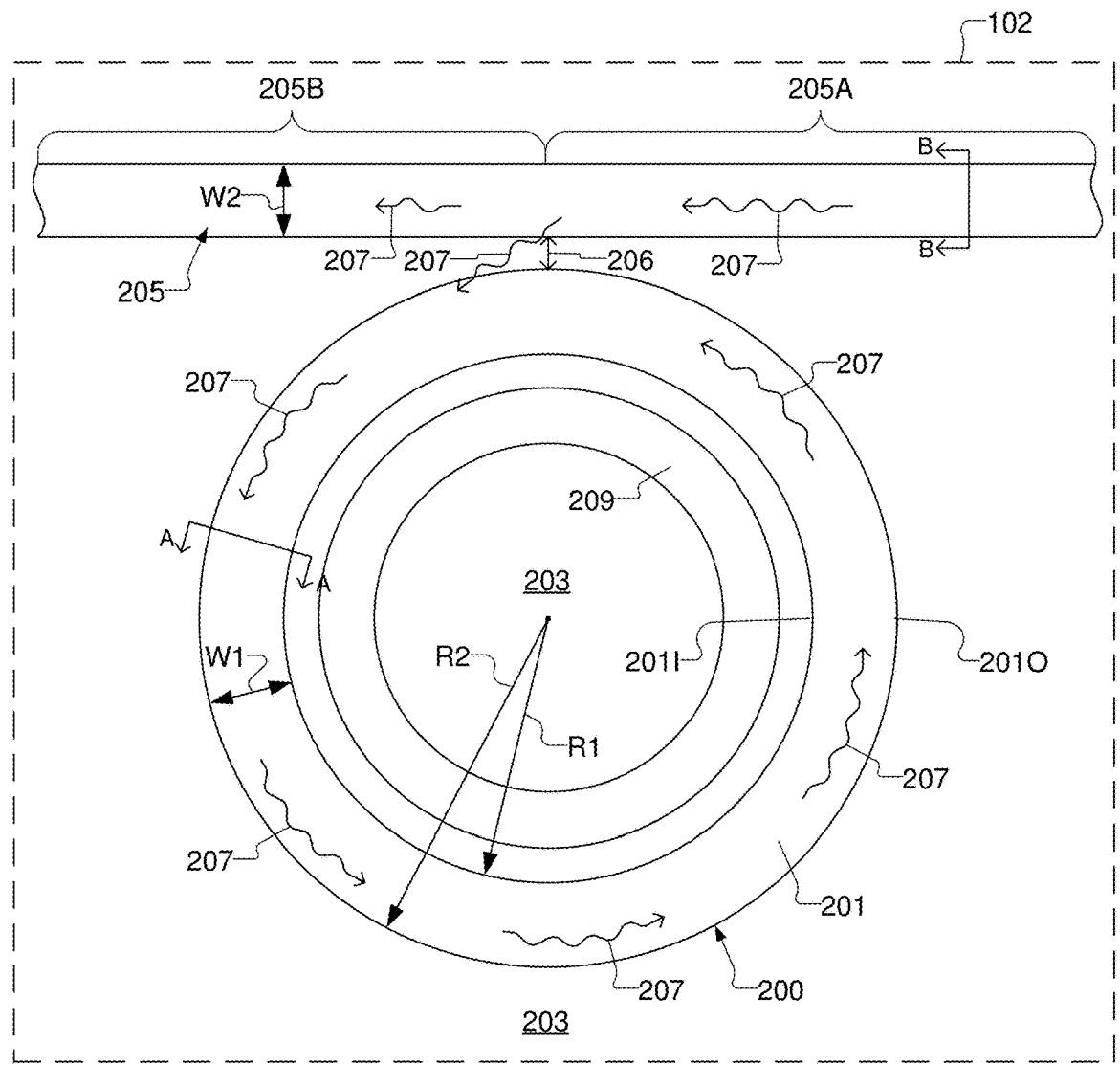
FIG. 2A shows a horizontal cross-section view of an example resonator device positioned next to an optical waveguide, in accordance with some embodiments.

FIG. 2A shows a horizontal cross-section view of an example resonator device 200 positioned next to an optical waveguide 205, in accordance with some embodiments. The resonator device 200 includes a passive optical cavity 201 having a circuitous configuration that loops back into itself. In the example of FIG. 2A, the passive optical cavity 201 has a substantially annular shape, e.g., a ring shape, defined by an inner wall surface 201I and an outer wall surface 201O. In various embodiments, the passive optical cavity 201 of the resonator device 200 can have a substantially circular shape or an oval shape. In some embodiments, the passive optical cavity 201 of the resonator device 200 can follow an arbitrary curved path. In some embodiments, the passive optical cavity 201 of the resonator device 200 can have a "race track" configuration, in which the passive optical cavity 201 has two parallel and substantially straight sections that are connected by curved or semi-circular-shaped sections. In the example of FIG. 2A, the passive optical cavity 201 having the annular shape is configured to have an inner radius R1, an outer radius R2, and a width W1, where W1=R2-R1. In some embodiments, the optical waveguide 205 is configured to have a substantially rectangular/linear shape having a width W2. However, in some embodiments, the optical waveguide 205 includes a curved section configured to curve around a portion of the passive optical cavity 201. The optical waveguide 205 extends past the outer wall surface 201O of the passive optical cavity 201 of the resonator device 200, such that a distance 206 is a closest distance between the optical waveguide 205 and the outer wall surface 201O of the passive optical cavity 201.

Figure 2B:
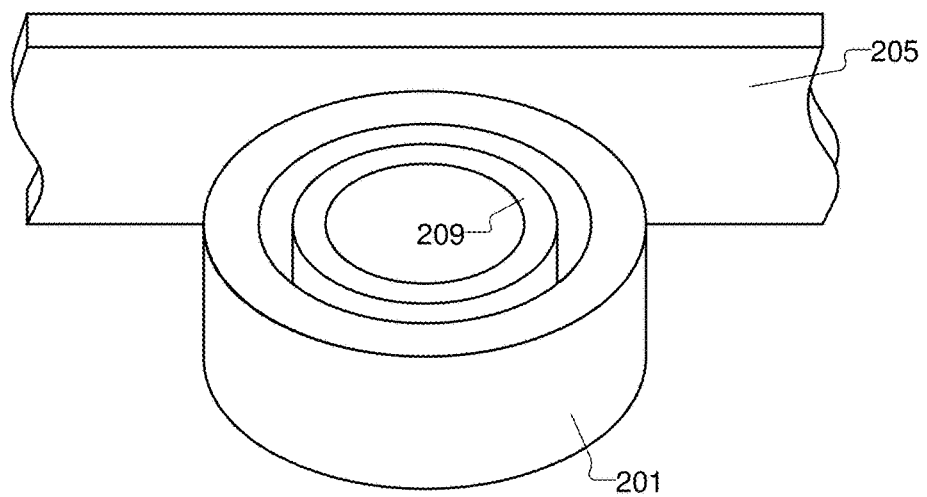
FIG. 2B shows a perspective view of the resonator device and optical waveguide, in accordance with some embodiments.

FIG. 2B shows a perspective view of the resonator device 200 and optical waveguide 205, in accordance with some embodiments. The resonator device 200 includes a thermal tuning device 209. In the example of FIGS. 2A and 2B, the thermal tuning device 209 is disposed inside of the passive optical cavity 201. In other embodiments, however, the thermal tuning device 209 is disposed outside of the passive optical cavity 201, or both inside and outside of the passive optical cavity 201. In some embodiments, the thermal tuning device 209 is configured to supply a substantially uniform heat flux to the passive optical cavity 201 around the circumference of the passive optical cavity 201. In the example of FIGS. 2A and 2B, the thermal tuning device 209 has an annular cylindrical shape and is positioned in a substantially concentric manner with respect to the passive optical cavity 201, which also has an annular cylindrical shape. In some embodiments, however, the thermal tuning device 209 and the passive optical cavity 201 do not have a concentric spatial relationship with each other. In some embodiments, the thermal tuning device 209 is a resistance heating device driven by electrical current. The thermal tuning device 209 is connected to a tuning control system, which operates to control the temperature of the passive optical cavity 201 by way of the thermal tuning device 209.

In various embodiments, the resonator device 200 can be used to perform optical modulation, optical detection, opto-mechanical transduction, chemical and/or biological sensing, among other operations, by way of example. In an alternative embodiment, the resonator device 200 is defined as a disc resonator device, in which the passive optical cavity 201 is defined as a disc-shaped optical cavity. In various embodiments, the disc-shaped optical cavity has a substantially circular shape or an oval shape. Although the examples of FIGS. 2A and 2B show a ring-shaped resonator device 200, it should be understood that any of the embodiments disclosed herein can be alternatively and equivalently implemented in conjunction with a resonator device that implements a non-ring-shaped passive optical cavity. For example, any of the embodiments disclosed herein can be alternatively and equivalently implemented in conjunction with a resonator device that implements a disc-shaped resonator device in place of the ring-shaped resonator device 200, where the disc-shaped resonator device has a disc-shaped passive optical cavity instead of the ring-shaped passive optical cavity 201. Also, any of the embodiments disclosed herein can be alternatively and equivalently implemented in conjunction with a resonator device that implements a passive optical cavity having an arbitrary shape and size that is neither ring-shaped nor disc-shaped, such as the race-track-shaped passive optical cavity, among others.

In various implementations, light 207 is evanescently coupled from the optical waveguide 205 into the passive optical cavity 201 of the resonator device 200. In various implementations, light 207 that is coupled into the passive optical cavity 201 of the resonator device 200 is efficiently routed to a separate output optical waveguide or absorbed within the resonator device 200, at specific wavelengths. The optical waveguide 205 includes an input portion 205-1 and an output portion 205-2. Incoming light 207 travels through the input portion 205-1 of the optical waveguide 205 toward the resonator device 200. As the light 207 travels through the optical waveguide 205 near the resonator device 200, a portion of the light 207 will couple into the passive optical cavity 201 of the resonator device 200, and a remaining portion of the light 207 will travel on through the output portion 205-2 of the optical waveguide 205.

In the example embodiment of FIG. 2A, the optical waveguide 205 has a substantially linear configuration as it extends past the resonator device 200. However, in other embodiments the optical waveguide 205 can have a non-linear configuration, such that the optical waveguide 205 curves around a portion of the resonator device 200. In some embodiments, a portion of the optical waveguide 205 that curves around the portion of the resonator device 200 can have a radius of curvature similar to that of the passive optical cavity 201 of the resonator device 200. It should be understood that the optical waveguide 205 is configured (shaped, sized, and positioned) to enable coupling of light 207 that travels through the optical waveguide 205 into the passive optical cavity 201 of the resonator device 200 as the light travels through the optical waveguide 205 near the resonator device 200.

In various embodiments, the resonator device 200 and optical waveguide 205 can be implemented in essentially any material system in which an optical resonator device can be implemented, including by way of example, crystalline silicon surrounded by silicon dioxide cladding, or any number of dielectric materials that support reasonably high refractive index contrast and low propagation loss at optical and infrared frequencies. In some embodiments, each of the optical waveguide 205 and resonator device 200 is formed of a high refractive index material (e.g., crystalline silicon, among others) within a layer of a low refractive index material (e.g., silicon dioxide, among others). In some embodiments, each of the optical waveguide 205 and resonator device 200 is formed to have an opposite refractive polarity in which each of the optical waveguide 205 and resonator device 200 is defined by an absence of high refractive index material within a guiding layer of high refractive index material.

In various embodiments, the passive optical cavity 201 is formed of either monocrystalline silicon, polycrystalline silicon, amorphous silicon, silica, glass, silicon nitride (SiN, $Si_3N_4$), or III-V semiconductor material, among others, by way of example. In some embodiments, the passive optical cavity 201 can be formed by etching its structure from a layer of the material of which it is formed. However, it should be understood that in various embodiments the passive optical cavity 201 can be formed by essentially any suitable manufacturing technique or combination of techniques, of which etching is an example. Also, it should be understood that the passive optical cavity 201 is surrounded by a cladding material 203 that has a lower refractive index relative to the material of the passive optical cavity 201. In various embodiments, by way of example, the cladding material 203 is either silicon dioxide ($SiO_2$), silicon nitride ($Si_3N_4$), air, or another material having a suitably lower refractive index relative to whatever material is used for the passive optical cavity 201.

In some embodiments, a horizontal cross-section of the outer wall surface 201O of the passive optical cavity 201 is configured to have a substantially circular shape. In some embodiments, the radius R2 of the outer wall surface 201O of the passive optical cavity 201 is within a range extending from about 2000 nanometers (nm) to about 50000 nm. In some embodiments, the radius R2 of the outer wall surface 201O of the passive optical cavity 201 is about 5000 nm. It should be understood, however, that in some embodiments the radius R2 of the outer wall surface 201O of the passive optical cavity 201 is less than 2000 nm or greater than 50000 nm. Also, in some embodiments, the passive optical cavity 201 has a non-circular outer perimeter. For example, in some embodiments, the passive optical cavity 201 has an oval-shaped or race-track-shaped outer perimeter. Also, in some embodiments, the passive optical cavity 201 has a circuitous outer perimeter that is non-symmetric about a centerline of the resonator device 200.

Figure 2C:
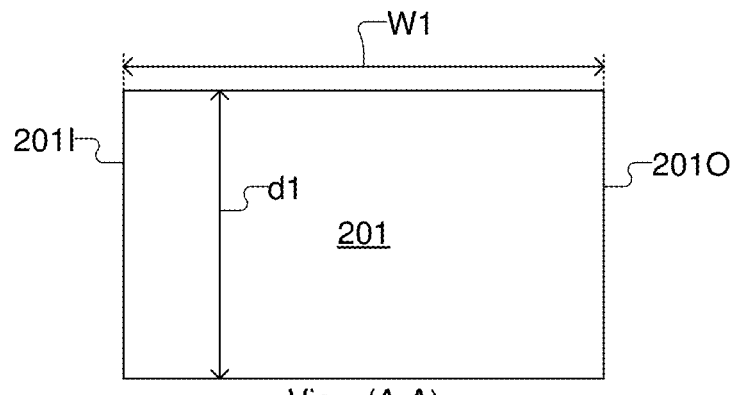
FIG. 2C shows a vertical cross-section view A-A of the passive optical cavity, as referenced in FIG. 2A, in accordance with some embodiments.

FIG. 2C shows a vertical cross-section view A-A of the passive optical cavity 201, as referenced in FIG. 2A, in accordance with some embodiments. In the example configuration of FIG. 2C, the passive optical cavity 201 has a substantially uniform vertical thickness d1. In some embodiments, the vertical thickness d1 is within a range extending from about 30 nm to about 300 nm. In some embodiments, the vertical thickness d1 is about 80 nm. It should be understood, however, that in other embodiments the vertical thickness d1 is either less than 30 nm or greater than 300 nm. Also, in the example configuration of FIG. 2C, the passive optical cavity 201 has the radial width W1. In some embodiments, the radial width W1 is within a range extending from about 500 nm to about 3000 nm. In some embodiments, the radial width W1 is about 1200 nm. It should be understood, however, that in other embodiments the radial width W1 is either less than 500 nm or greater than 3000 nm.

Figure 2D:
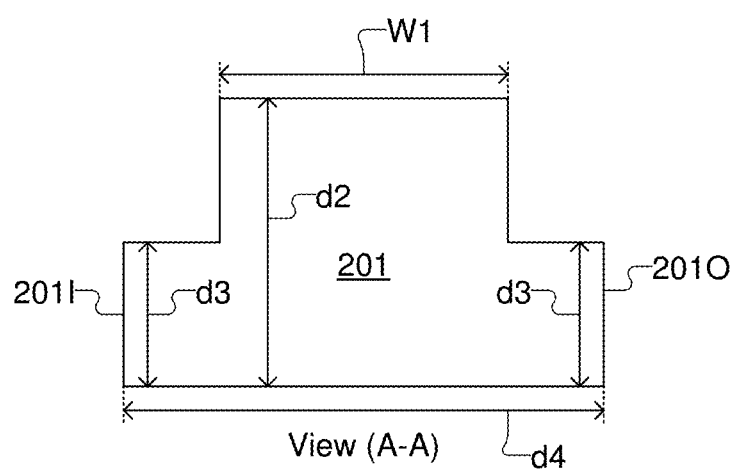
FIG. 2D shows another vertical cross-section view A-A of the passive optical cavity, as referenced in FIG. 2A, in accordance with some embodiments.

FIG. 2D shows another vertical cross-section view A-A of the passive optical cavity 201, as referenced in FIG. 2A, in accordance with some embodiments. In the example configuration of FIG. 2D, the passive optical cavity 201 has a stepped shape in which a central region of the passive optical cavity 201 has a vertical thickness d2 that is greater than a vertical thickness d3 of inner and outer portions of the passive optical cavity 201, formed inside and outside, respectively of the central region of the passive optical cavity 201. In some embodiments, the vertical thickness d2 is within a range extending from about 150 nm to about 300 nm. In some embodiments, the vertical thickness d2 is about 200 nm. It should be understood, however, that in other embodiments the vertical thickness d2 is either less than 150 nm or greater than 300 nm. In some embodiments, the vertical thickness d3 is within a range extending from about 30 nm to about 150 nm. In some embodiments, the vertical thickness d3 is about 80 nm. It should be understood, however, that in other embodiments the vertical thickness d3 is either less than 30 nm or greater than 150 nm. Also, in the example configuration of FIG. 2D, the central region of the passive optical cavity 201 has the radial width W1. In some embodiments, the radial width W1 is within a range extending from about 500 nm to about 3000 nm. In some embodiments, the radial width W1 is about 1200 nm. It should be understood, however, that in other embodiments the radial width W1 is either less than 500 nm or greater than 3000 nm. Also, in the example configuration of FIG. 2D, the passive optical cavity 201 has an overall radial width d4. In some embodiments, the radial width d4 is within a range extending from about 500 nm to about 5000 nm. In some embodiments, the radial width d4 is about 3000 nm. It should be understood, however, that in other embodiments the radial width d4 is either less than 500 nm or greater than 5000 nm. In some embodiments, the example configuration of FIG. 2D may be inverted vertically, such that the central region with vertical thickness d2 protrudes downwards, as opposed to upwards as is shown in FIG. 2D.

In some embodiments, the material composition and dimensions of the optical waveguide 205 are defined such that only desired optical modes of light couple into the passive optical cavity 201 of the resonator device 200. For example, in some embodiments, the optical waveguide 205 is configured such that coupling of light into the passive optical cavity 201 of the resonator device 200 is limited to a light wavelength corresponding to a fundamental optical mode of the resonator device 200. In various embodiments, the optical waveguide 205 can be formed of essentially any material through which light can be channeled from an entry location on the optical waveguide 205 to an exit location on the optical waveguide 205. For example, in various embodiments, the optical waveguide 205 is formed of glass, silicon nitride (SiN), silicon dioxide ($SiO_2$), germanium-oxide ($GeO_2$), and/or silica, among other materials. Also, in some embodiments, the optical waveguide 205 is configured to maintain a polarization of light as it travels through the optical waveguide 205.

Figure 2E:
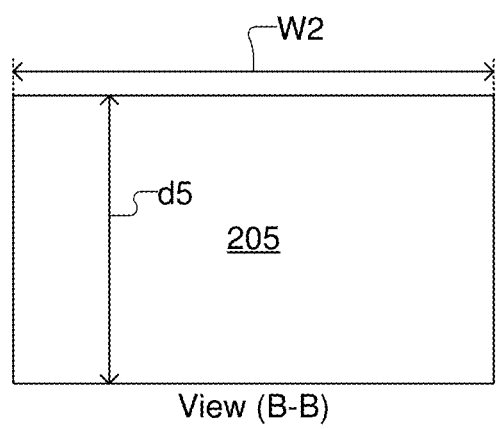
FIG. 2E shows a vertical cross-section view B-B of the optical waveguide, as referenced in FIG. 2A, in accordance with some embodiments.

FIG. 2E shows a vertical cross-section view B-B of the optical waveguide 205, as referenced in FIG. 2A, in accordance with some embodiments. In the example configuration of FIG. 2E, the optical waveguide 205 has a substantially uniform vertical thickness d5. In some embodiments, the vertical thickness d5 is within a range extending from about 30 nm to about 300 nm. In some embodiments, the vertical thickness d5 is about 80 nm. It should be understood, however, that in other embodiments the vertical thickness d5 is either less than 30 nm or greater than 300 nm. Also, in the example configuration of FIG. 2E, the optical waveguide 205 has a width W2. In some embodiments, the width W2 is within a range extending from about 300 nm to about 1000 nm. In some embodiments, the width W2 is about 400 nm. It should be understood, however, that in other embodiments the width W2 is either less than 300 nm or greater than 1000 nm.

Figure 2F:
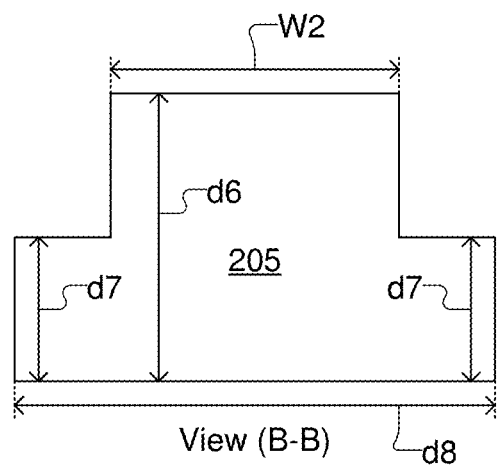
FIG. 2F shows another vertical cross-section view B-B of the optical waveguide, as referenced in FIG. 2A, in accordance with some embodiments.

FIG. 2F shows another vertical cross-section view B-B of the optical waveguide 205, as referenced in FIG. 2A, in accordance with some embodiments. In the example configuration of FIG. 2F, the optical waveguide 205 has a stepped shape in which a central region of the optical waveguide 205 has a vertical thickness d6 that is greater than a vertical thickness d7 of inner and outer portions of the optical waveguide 205, formed inside and outside, respectively of the central region of the optical waveguide 205. In some embodiments, the vertical thickness d7 is within a range extending from about 50 nm to about 150 nm. In some embodiments, the vertical thickness d7 is about 80 nm. It should be understood, however, that in other embodiments the vertical thickness d7 is either less than 50 nm or greater than 150 nm. In some embodiments, the vertical thickness d6 is within a range extending from about 150 nm to about 300 nm. In some embodiments, the vertical thickness d6 is about 200 nm. It should be understood, however, that in other embodiments the vertical thickness d6 is either less than 150 nm or greater than 300 nm. Also, in the example configuration of FIG. 2F, the central region of the optical waveguide 205 has the width W2. In some embodiments, the width W2 is within a range extending from about 200 nm to about 1000 nm. In some embodiments, the width W2 is about 400 nm. It should be understood, however, that in other embodiments the width W2 is either less than 200 nm or greater than 1000 nm. Also, in the example configuration of FIG. 2F, the optical waveguide 205 has an overall width d8. In some embodiments, the width d8 is within a range extending from about 500 nm to about 3000 nm. In some embodiments, the width d8 is about 1200 nm. It should be understood, however, that in other embodiments the width d8 is either less than 500 nm or greater than 3000 nm. In some embodiments, the example configuration of FIG. 2F may be inverted vertically, such that the central region with vertical thickness d6 protrudes downwards, as opposed to upwards as is shown in FIG. 2F.

For many applications, it is desirable for the passive optical cavity 201 of the resonator device 200 to have a large radial width W1 in order to reduce internal light loss. This is especially true for devices in which metal electrical contacts are placed on or near the inner wall surface 2011 for thermal tuning or to contact diode junctions built into the resonator device 200. However, if the radial width W1 of the passive optical cavity 201 of the resonator device 200 is sufficiently large, the resonator device 200 will support multiple radial modes (or transverse modes) that have different resonant wavelengths and loss rates, which can complicate applications that require a single mode resonator device. Therefore, implementation of the resonator device 200 that has a larger radial width W1 depends on an ability to selectively couple light from an external optical waveguide, (e.g., the optical waveguide 105) into a preferred radial mode of the resonator device 200, and not into non-preferred radial modes of the resonator device 200.

Figure 3:
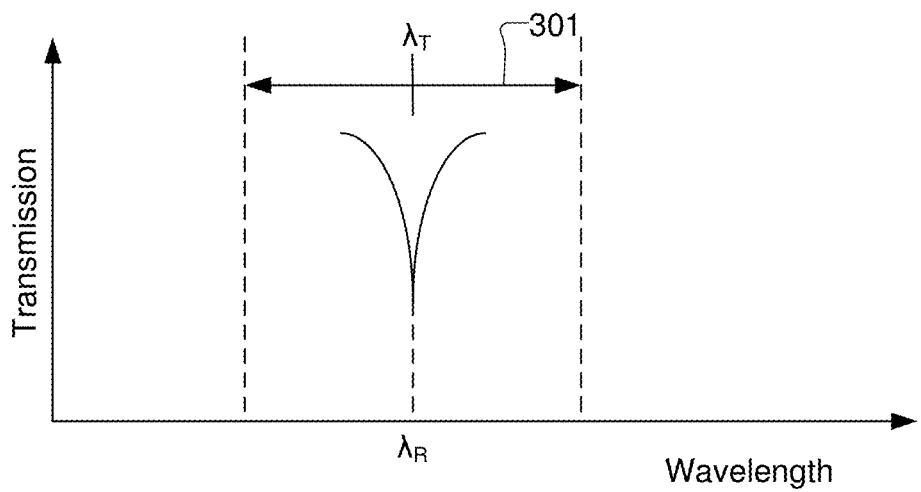
FIG. 3 shows an example light transmission spectrum of the resonator device, in accordance with some embodiments.

FIG. 3 shows an example light transmission spectrum of the resonator device 200, in accordance with some embodiments. The light transmission spectrum shows that the resonator device 200 has a resonance wavelength $\lambda_R$, corresponding to a fundamental mode of the resonator device 200. In some embodiments and/or implementations, the resonance wavelength $\lambda_R$ of the resonator device 200 needs to be tuned to substantially match a target wavelength $\lambda_T$ of light that is to couple into the resonator device 200, as shown in FIG. 3. In some embodiments, the target wavelength $\lambda_T$ is the wavelength of CW light generated by a laser, where the CW light is to be modulated by the resonator device 200. In some embodiments, it is desired for the resonator device 200 to have a wavelength tuning range 301 that is as large as possible so that the resonance wavelength $\lambda_R$ of the resonator device 200 can be successfully tuned to a wide range of target wavelengths T. In some embodiments, thermal tuning of the resonator device 200, such as provided by the thermal tuning device 209, is an effective method for tuning the resonance wavelength $\lambda_R$ of the resonator device 200 across the wavelength tuning range 301 to substantially match a particular target wavelength T. Therefore, it is of interest to have the wavelength tuning range 301 be as large as possible in order to maximize the resonance wavelength $\lambda_R$ tuning ability of the resonator device 200.

Figure 4:
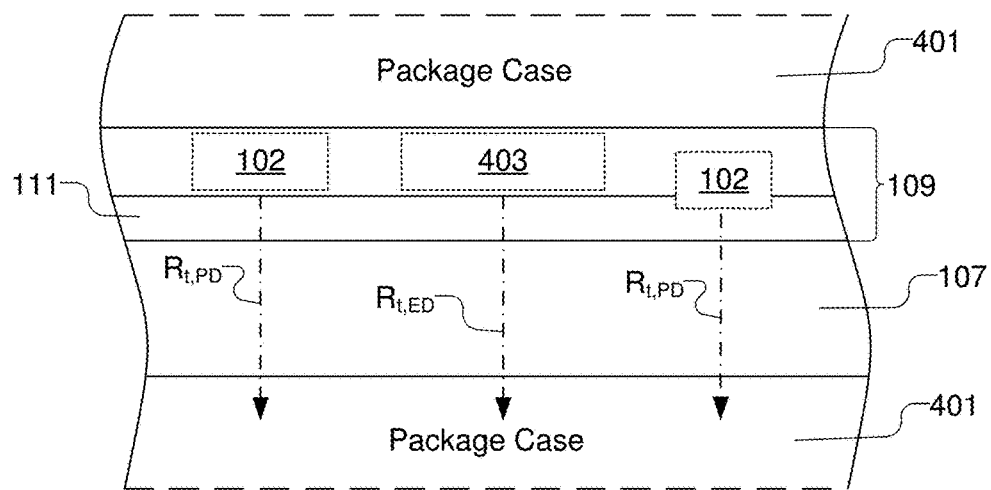
FIG. 4 shows a vertical cross-section schematic of a portion of the die inside of a package case, in accordance with some embodiments.

FIG. 4 shows a vertical cross-section schematic of a portion of the die 101 inside of a package case 401, in accordance with some embodiments. The device layer in the front region 109 of the die 101 includes both photonic devices 102 and electronic devices 403. The electronic devices 403 include any type of electronic device that can be present within an integrated circuit formed on a semiconductor chip. In some embodiments, the photonic devices 102 are located between neighboring electronic devices 403. Also, in some embodiments, the photonic devices 102 are located adjacent to, and possibly close to, neighboring electronic devices 403. The proximity of photonic devices 102 to neighboring electronic devices 403 can present design and operational challenges when the photonic devices 102 and neighboring electronic devices 403 have different thermal requirements.

In CMOS implementations, electronic devices 403 benefit from a very low thermal resistance $R_{t,ED}$ between the electronic devices 403 and the package case 401. This enables an overall lower operating temperature for the electronic devices 403 (because power is more easily dissipated), which in turn results in better performance and reliability of the electronic devices 403. However, many photonic devices 102 include elements that are thermally tuned, which benefit from a higher thermal resistance $R_{t,ED}$ between the photonic device 102 and the package case 401. For example, some photonic devices 102, such as the ring resonator 200, are sensitive to temperature variations and need to be thermally controlled in a precise manner, which requires an amount of thermal isolation, while some electronic devices 403, such as transistors, need to be cooled as much as possible, which requires maximum thermal conduction to the package 401 in order to prevent overheating. Also, in order to achieve a large wavelength tuning range 301 of the resonator device 200 within the photonic device 102, it is necessary to establish a higher thermal resistance $R_{t,ED}$ between the resonator device 200 and a heat sink outside of the package 401, such as the ambient environment. However, in order to maintain a sufficiently low operating temperature of the electronic device 403, it is necessary to establish a lower thermal resistance $R_{t,ED}$ between the electronic device 403 and the heat sink outside of the package 401, such as the ambient environment. Therefore, it is of interest to locally increase the thermal resistance $R_{t,PD}$ between the resonator device 200 and the package 401 without adversely impacting the thermal resistance $R_{t,ED}$ between neighboring electronic devices 403 and the package 401. Systems and methods are disclosed herein for locally increasing the thermal resistance $R_{t,PD}$ between the resonator device 200 and external heat sink of the die 101 without significantly impacting heat dissipation from neighboring electronic devices 403 to the external heat sink of the die 101. In other words, systems and methods are disclosed herein for providing different thermal resistances ($R_{t,PD}$, $R_{t,ED}$) for photonic devices 102 and electronic devices 403 on the same semiconductor wafer.

Figure 5A:
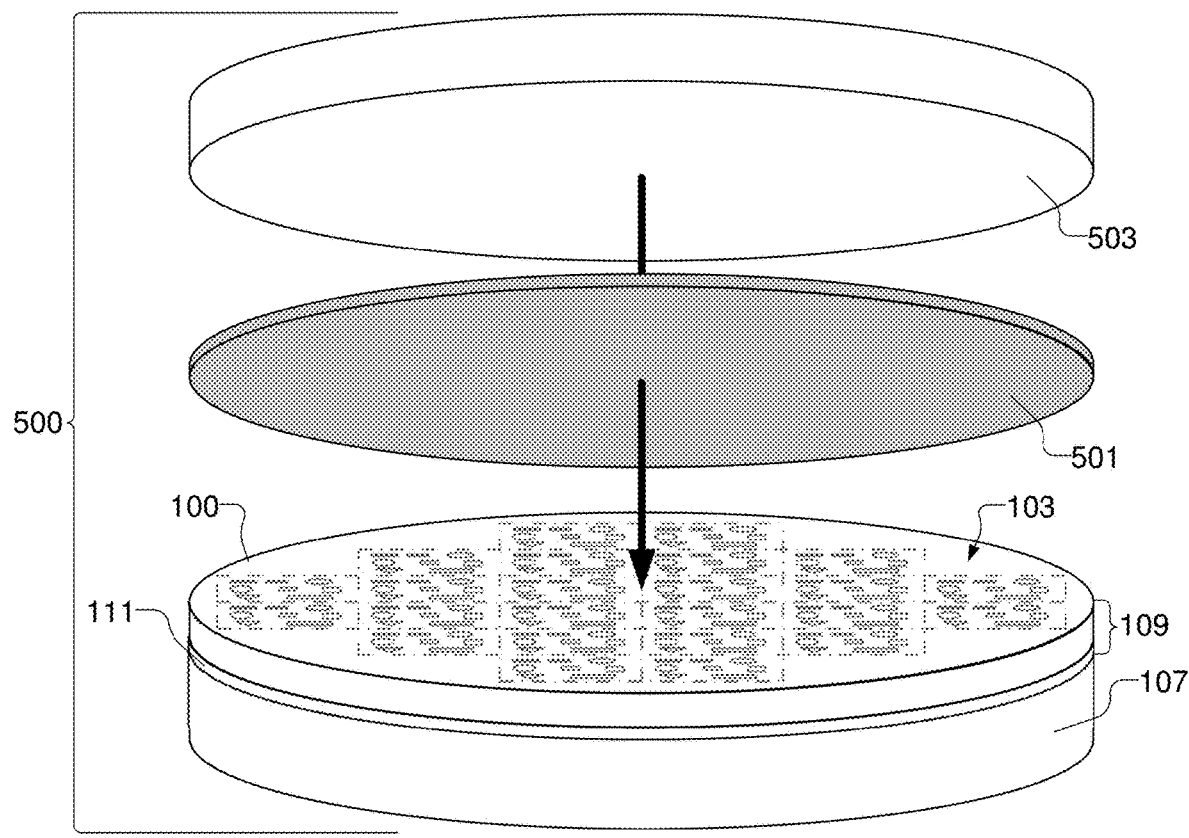
FIG. 5A shows a perspective view of an exploded arrangement for securing/bonding a wafer support system (WSS) to the device wafer to form a composite wafer assembly, in accordance with some embodiments.

FIG. 5A shows a perspective view of an exploded arrangement for securing/bonding a wafer support system (WSS) 503 to the device wafer 100 to form a composite wafer assembly 500, in accordance with some embodiments.

Figure 5B:
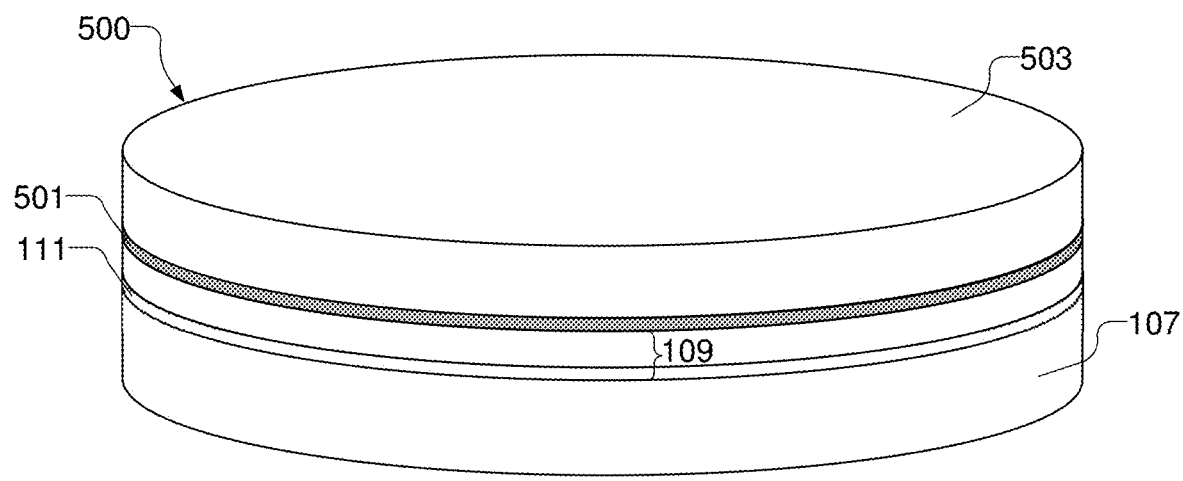
FIG. 5B shows a perspective view of the composite wafer assembly in assembled form, in accordance with some embodiments.

In some embodiments, the WSS 503 is secured to the top surface 103 of the device wafer 100 by a layer of temporary adhesive 501. In various embodiments, the temporary adhesive 501 can be essentially any adhesive that is suitable for temporarily securing the WSS 503 to the device wafer 100 without causing damage to the device wafer 100, such that the composite wafer assembly 500 can remain mechanically stable when exposed to mechanical and thermal conditions during subsequent processing of device wafer 100. FIG. 5B shows a perspective view of the composite wafer assembly 500 in assembled form, in accordance with some embodiments. In some embodiments, the WSS 503 is formed as a silicon wafer or a glass wafer. The thickness of the WSS 503 is sufficient to provide for mechanical stability of the composite wafer assembly 500. It should be understood that the WSS 503 is attached to the front region 109 of the device wafer 100 that includes the electronic devices 403 and photonic devices 102. After the WSS 503 is attached to the device wafer 100, the base layer 107 (handle silicon layer) of the device wafer 100 can be removed.

Figure 6A:
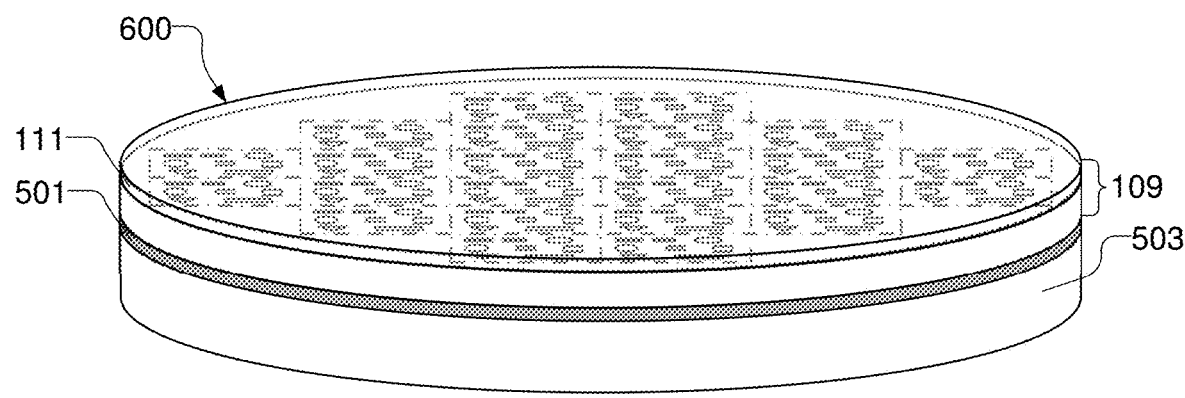
FIG. 6A shows a modified composite wafer assembly that corresponds to the composite wafer assembly after removal of the base layer, in accordance with some embodiments.
Figure 6B:
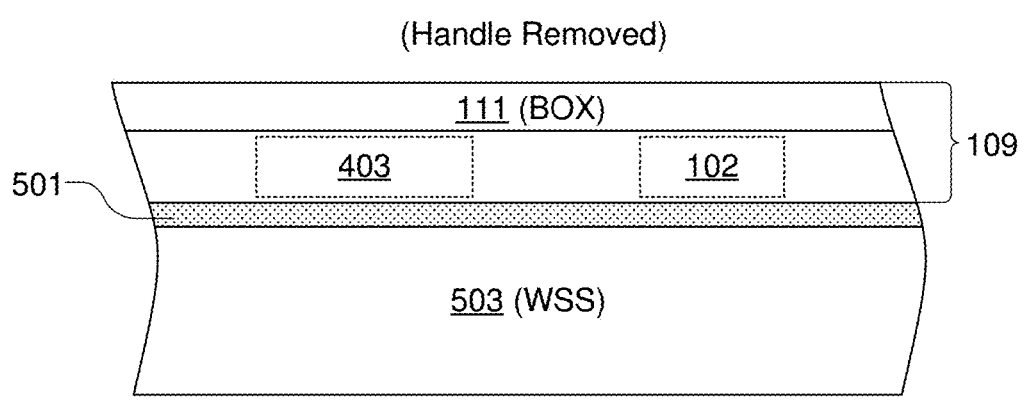
FIG. 6B shows a vertical cross-section schematic of a portion of the modified composite wafer assembly, in accordance with some embodiments.

FIG. 6A shows a modified composite wafer assembly 600 that corresponds to the composite wafer assembly 500 after removal of the base layer 107, in accordance with some embodiments. FIG. 6B shows a vertical cross-section schematic of a portion of the modified composite wafer assembly 600, in accordance with some embodiments. In some embodiments, the base layer 107 is removed from the device wafer 100 by performing a back-grinding process and/or a chemical mechanical polishing (CMP) process and/or a reactive ion etch process (RIE) on the bottom surface 105 of the device wafer 100. It should be understood that various process techniques/steps can be used to remove the base layer 107 from the device wafer 100. In some embodiments, the base layer 107 is completely removed to reveal the BOX layer at the lower portion 111 of the front region 109 of the device wafer 100. In some embodiments, the BOX layer at the lower portion 111 of the front region 109 of the device wafer 100 functions as an etch stop layer during removal of the base layer 107.

Figure 7A:
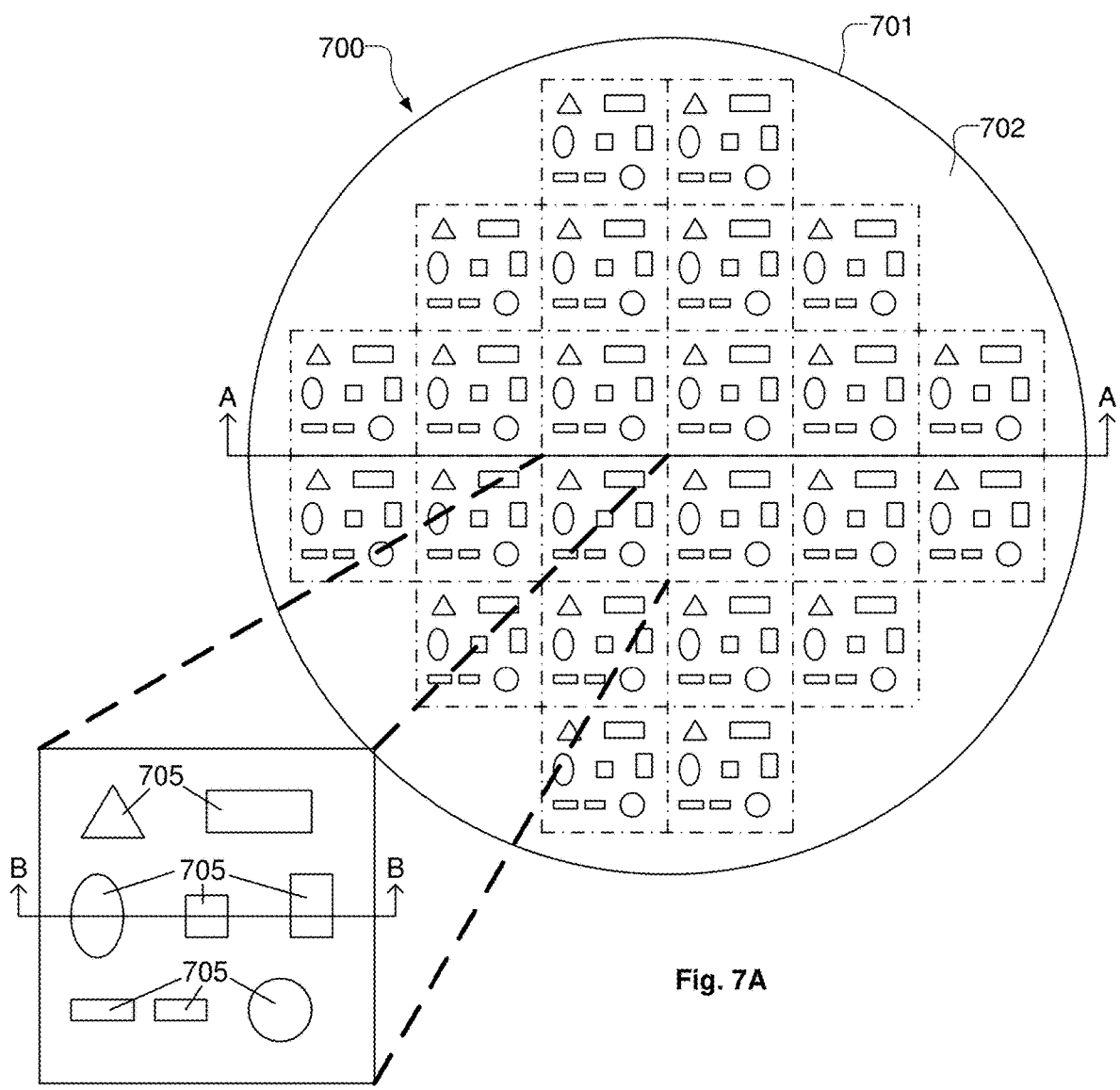
FIG. 7A shows a top view of a base layer of replacement handle wafer, in accordance with some embodiments.
Figure 7B:
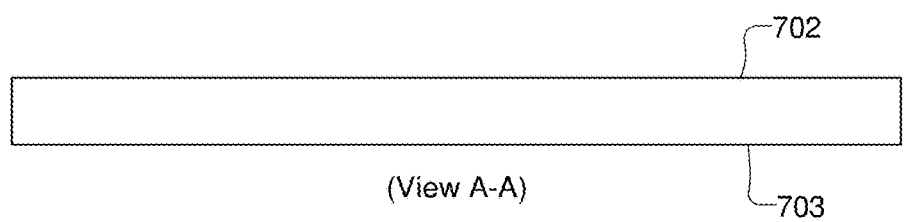
FIG. 7B shows a vertical cross-section view of the base layer of the replacement handle wafer, referenced as View A-A in FIG. 7A, in accordance with some embodiments.
Figure 7C:
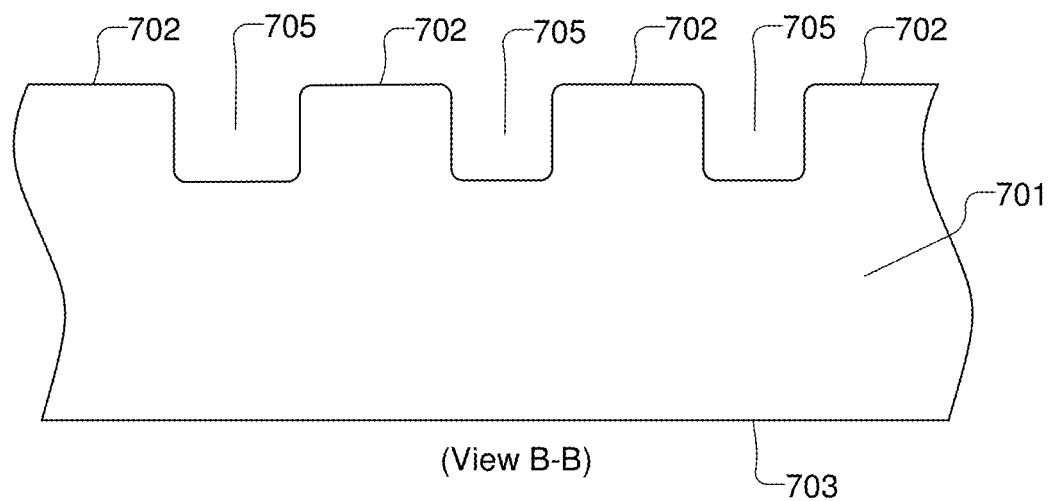
FIG. 7C shows a vertical cross-section through a portion of the base layer, referenced as View B-B in FIG. 7A, in accordance with some embodiments.

FIG. 7A shows a top view of a base layer 701 of replacement handle wafer 700, in accordance with some embodiments. FIG. 7B shows a vertical cross-section view of the base layer 701 of the replacement handle wafer 700, referenced as View A-A in FIG. 7A, in accordance with some embodiments. FIG. 7C shows a vertical cross-section through a portion of the base layer 701, referenced as View B-B in FIG. 7A, in accordance with some embodiments. The replacement handle wafer 700 is replacement for the base layer 107 (handle silicon) that was removed from the composite wafer assembly 500 to form the modified composite wafer assembly 600. The base layer has a top side 702 and a bottom side 703. The top side 702 of the base layer is configured to have a topography defined by cavities 705 formed into the base layer 701 from the top side 702. In some embodiments, the base layer 701 is a silicon wafer. The cavities 705 are positioned and sized so that the cavities 705 will overlie the photonic devices 102 in the device wafer 100 when the replacement handle wafer 700 is attached to the modified composite wafer assembly 600. In this manner, the cavities 705 will form respective regions of air above the photonic devices 102 within the die 101, which serves to increase the thermal resistance $R_{t,PD}$ associated with the photonic devices 102, thereby improving thermal control and power efficiency of the photonic devices 102. Each of the cavities 705 can have essentially any size and shape, such as circular, rectangular, and/or triangular, among others, as needed to enable a perimeter of a given cavity 705 to encompass a perimeter of a corresponding photonic device 102. In some embodiments, a given cavity 705 is sized to encompass a corresponding optical resonator structure, e.g., resonator device 200, in the die 101. In some embodiments, a given cavity 705 has a depth within a range extending from about 100 micrometers to about 1000 micrometers, as measured into the base layer 701 from the top side 702. Also, the depth of each cavity 705 is less than a thickness of the base layer 701. In some embodiments, the cavities 705 are formed using standard photolithography processes known in the art of semiconductor fabrication. The photolithography processes can be specified to define each dimension of the cavities 705, such as lateral dimensions and vertical/depth dimensions. In some embodiments, the vertical/depth dimension of the cavities 705 are controlled by an etch stop layer present within the base layer 701.

Figure 7D:
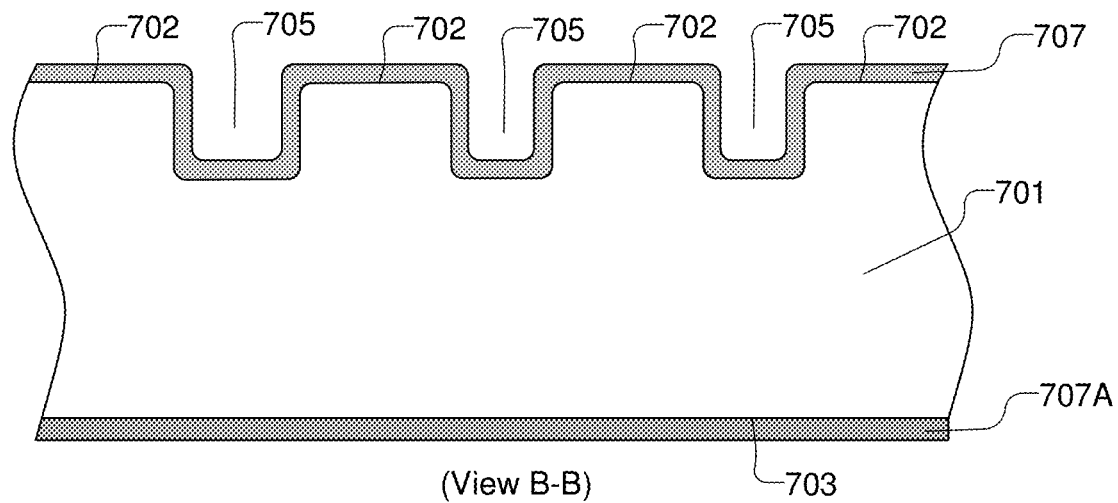
FIG. 7D shows the vertical cross-section of FIG. 7C following application of the layer of anti-reflective material to the top side of the base layer, in accordance with some embodiments.

After the cavities 705 are formed in the base layer 701, a layer of anti-reflective material 707 is applied to the top side 702 of the base layer 701. FIG. 7D shows the vertical cross-section of FIG. 7C following application of the layer of anti-reflective material 707 to the top side 702 of the base layer 701, in accordance with some embodiments. In some embodiments, the layer of anti-reflective material 707 is a layer of anti-reflection coating (ARC). In some embodiments, such as shown in FIG. 7D, the layer of anti-reflective material 707 is conformally deposited over the topography formed by the cavities on the top side 702 of the base layer 701. In some embodiments, each cavity 705 has at least one side surface and a bottom surface. In some embodiments, the layer of anti-reflective material 707 is substantially conformally disposed within each cavity 705 on the at least one side surface of the cavity 705 and on the bottom surface of the cavity 705. Also, in some embodiments, the layer of anti-reflective material 707 is disposed on the top side 702 of the base layer 701, such as shown in FIG. 7D. Therefore, in some embodiments, the interior surfaces of the cavities 705 and the top side 702 of the base layer 701 are covered by the layer of anti-reflective material 707. Also, in some embodiments, another layer of anti-reflective material 707A is optionally disposed on the bottom side 703 of the base layer 701.

In some embodiments, the layer of anti-reflective material 707/707A is disposed as a single layer of material. The anti-reflective material used to form the layer of anti-reflective material 707/707A has an optical index of refraction and a specified thickness to provide a specified anti-reflection performance. In some embodiments, the layer of anti-reflective material 707/707A is disposed as multiple layers of one or more materials. In these multiple layer embodiments, each layer of anti-reflective material has a specified optical index of refraction and a specified thickness to provide a specified anti-reflection performance. In some embodiments, the layer of anti-reflective material 707/707A is formed by multiple layers anti-reflective material in order to further reduce optical reflections beyond what is possible using a single layer of anti-reflective material. Also, use of multiple layers of anti-reflective material to form the layer of anti-reflective material 707/707A is particularly useful in cases where the optical index of refraction of the anti-reflective material is not precisely controlled. In some embodiments, two-dimensional and/or three-dimensional shaping of the layer of anti-reflective material 707/707A is done to improve optical anti-reflection performance as compared to the anti-reflection performance that is possible when the layer of anti-reflective material 707/707A has a one-dimensional planar structure.

In some embodiments, the anti-reflective material(s) used to form the layer of anti-reflective material 707/707A has a refractive index with a range extending from about 1.7 to about 3.6. There are numerous anti-reflective materials that have an optical index of refraction (refractive index) within the range extending from about 1.7 to about 3.6, including silicon nitride ($Si_3N_4$) having a refractive index of about 2.00, yttrium oxide ($Y_2O_3$) having a refractive index of about 1.9, tantalum oxide ($Ta_2O_5$) having a refractive index of about 2.07, niobium pentoxide ($Nb_2O_5$) having a refractive index of about 2.24, zinc sulfide (ZnS) having a refractive index of about 2.3, as well as materials where the refractive index can be tuned with process conditions such as silicon oxynitride (SiOxNy), aluminum oxide (Al2O3) having a refractive index of about 1.75, silicon (Si) having a refractive index of about 3.6, among others. In some embodiments, one or more anti-reflective material(s) used to form the layer of anti-reflective material 707/707A has a refractive index that is less than about 1.7. In some embodiments, one or more anti-reflective material(s) used to form the layer of anti-reflective material 707/707A has a refractive index that is greater than about 3.6. In some embodiments, the one or more anti-reflective material(s) used to form the layer of anti-reflective material 707/707A is selected to also function as an insulating layer to protect from moisture and/or oxygen diffusion into the die 101, so as to hermetically seal the die 101.

In some embodiments, the layer of anti-reflective material 707/707A has a thickness within a range extending from about 100 nanometers to about 500 nanometers. In some embodiments, the layer of anti-reflective material 707/707A has a thickness within a range extending from about 140 nanometers to about 160 nanometers. In some embodiments, the thickness of the layer of anti-reflective material 707/707A follows the approximate formula for a "quarter-wave" stack, which is given by Equation 1.

$$(coating\_thickness)*cos(theta)=(wavelength/4)/(coating\_refractive\_index) \quad \text{Equation 1.}$$

In some embodiments, the thickness of the layer of anti-reflective material 707/707A is sufficient to protect from moisture and/or oxygen diffusion into the die 101, so as to hermetically seal the die 101. In some embodiments, the layer of anti-reflective material 707/707A is formed by physical vapor deposition and/or chemical vapor deposition, but it should be understood that other thin film deposition technologies can also be used to form the layer of anti-reflective material 707/707A, such as solution-based thin film deposition technologies, among others.

Figure 8A:
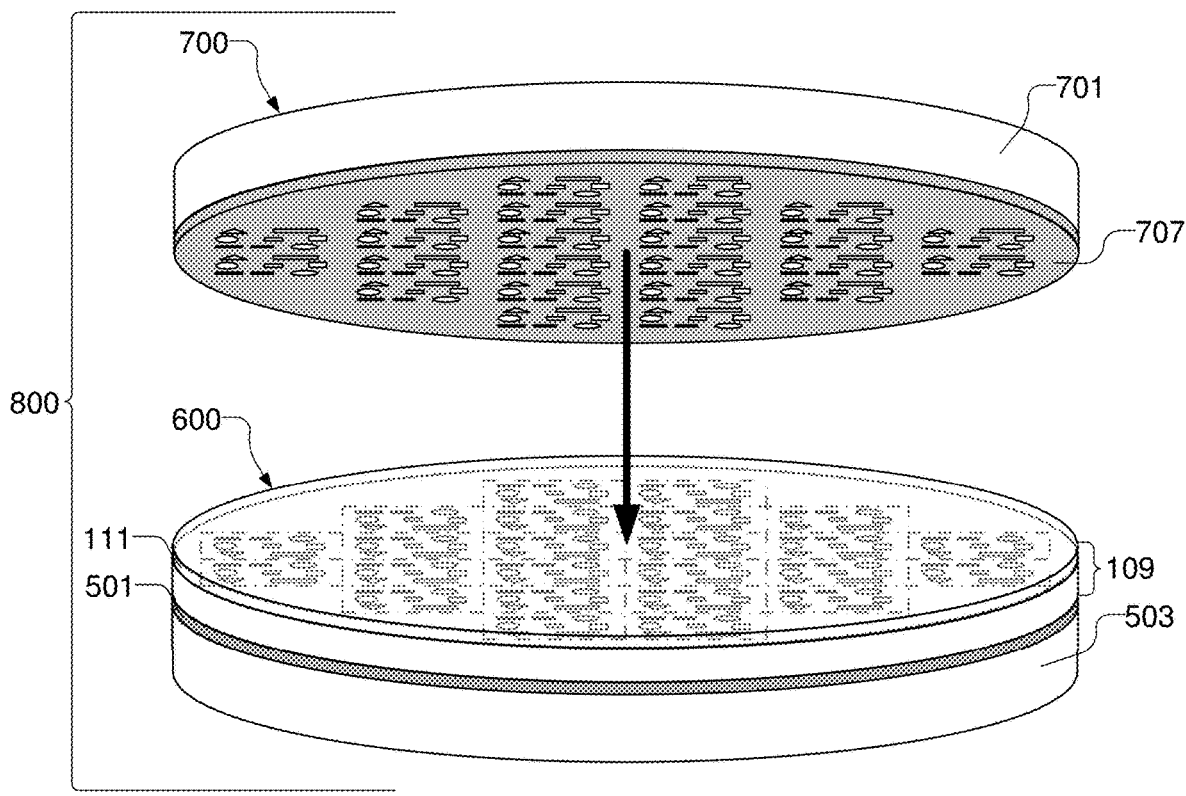
FIG. 8A shows a perspective view of an exploded arrangement for securing/bonding the replacement handle wafer to the modified composite wafer assembly to form a handle-integrated composite wafer assembly, in accordance with some embodiments.
Figure 8B:
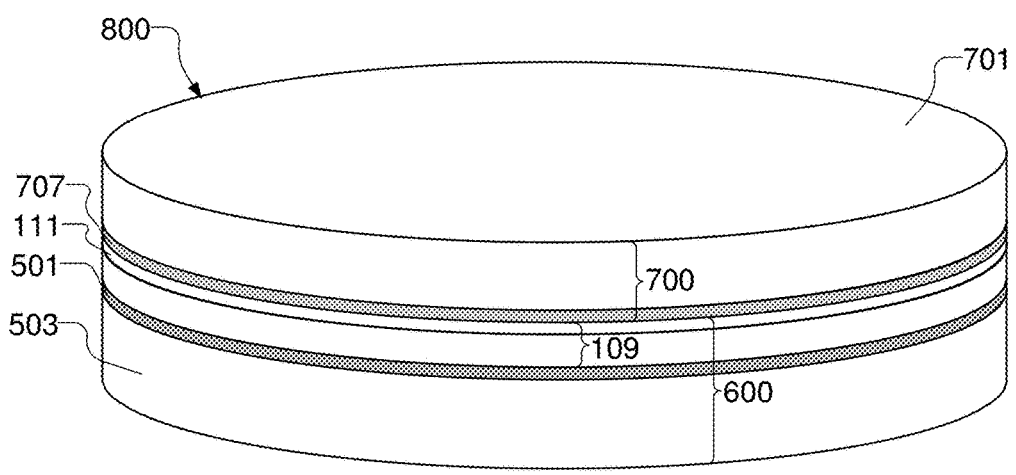
FIG. 8B shows a perspective view of the handle-integrated composite wafer assembly in assembled form, in accordance with some embodiments.
Figure 8C:
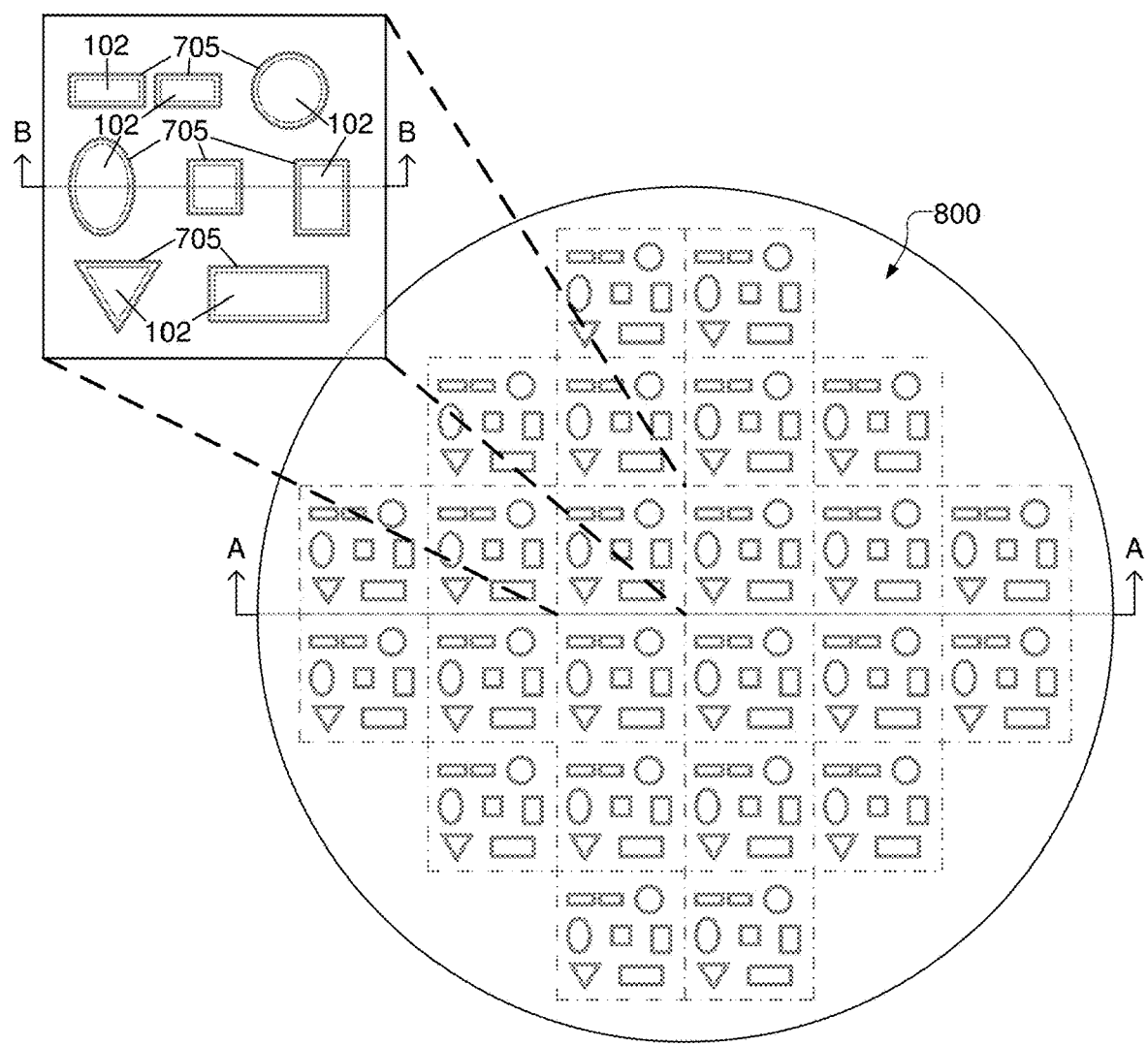
FIG. 8C shows a top view of the handle-integrated composite wafer assembly, in accordance with some embodiments.

FIG. 8A shows a perspective view of an exploded arrangement for securing/bonding the replacement handle wafer 700 to the modified composite wafer assembly 600 to form a handle-integrated composite wafer assembly 800, in accordance with some embodiments. FIG. 8B shows a perspective view of the handle-integrated composite wafer assembly 800 in assembled form, in accordance with some embodiments. FIG. 8C shows a top view of the handle-integrated composite wafer assembly 800, in accordance with some embodiments. The replacement handle wafer 700 is shown in a transparent manner in FIG. 8C to reveal the spatial relationship between the cavities 705 and the photonic devices 102. To form the handle-integrated composite wafer assembly 800, the top surface of the replacement handle wafer 700 into which the cavities 705 are formed (the top surface of the layer of anti-reflective material 707) is permanently bonded to the surface of the modified composite wafer assembly 600 that was exposed by removing the base layer 107 (to the BOX material). Various wafer bonding methods can be used to permanently bond the replacement handle wafer 700 to the modified composite wafer assembly 600. For example, fusion bonding can be used for bonding silicon to silicon, or glass to glass, or polymethylmethacrylate (PMMA) to PMMA, etc. Anodic bonding can be used for bonding silicon to glass. Also, in some embodiments, an adhesive can be used to permanently bond the replacement handle wafer 700 to the modified composite wafer assembly 600.

Figure 8D:
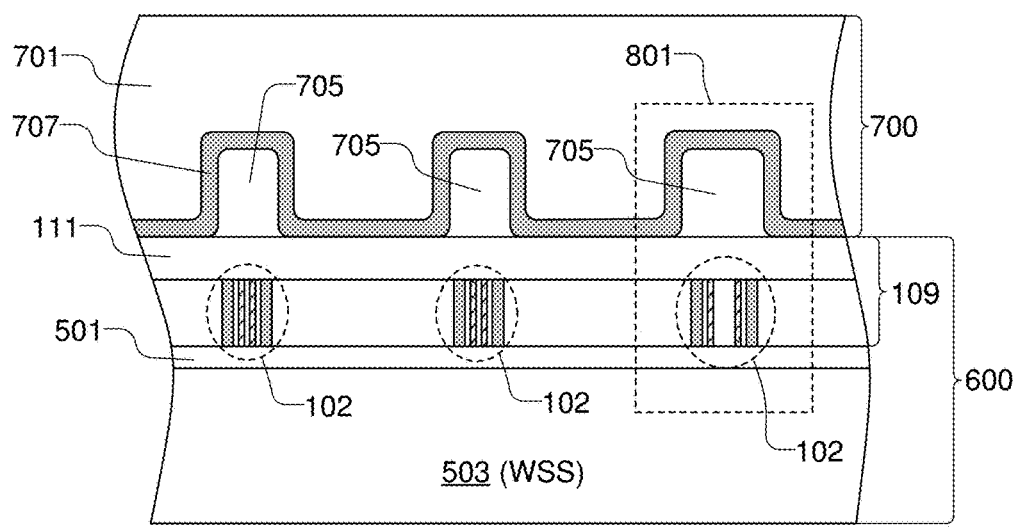
FIG. 8D shows a vertical cross-section schematic of a portion of the handle-integrated composite wafer assembly, referenced as View B-B in FIG. 8C, in accordance with some embodiments.
Figure 8E:
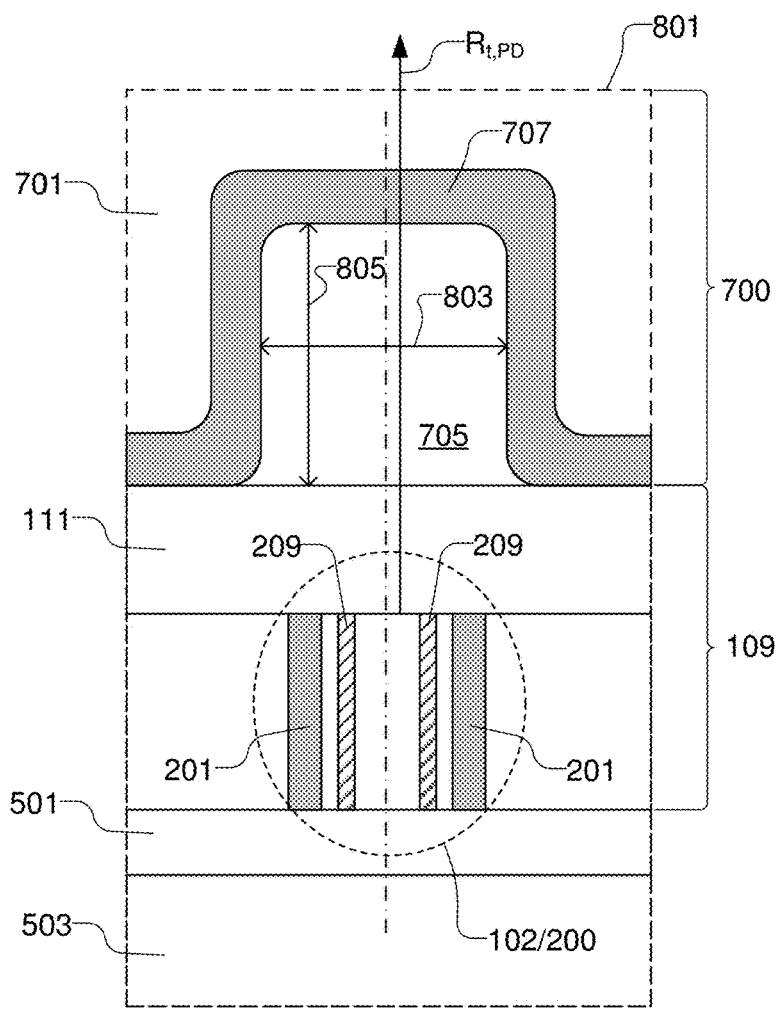
FIG. 8E shows a close-up view of the portion of FIG. 8D, in accordance with some embodiments.
Figure 8F:
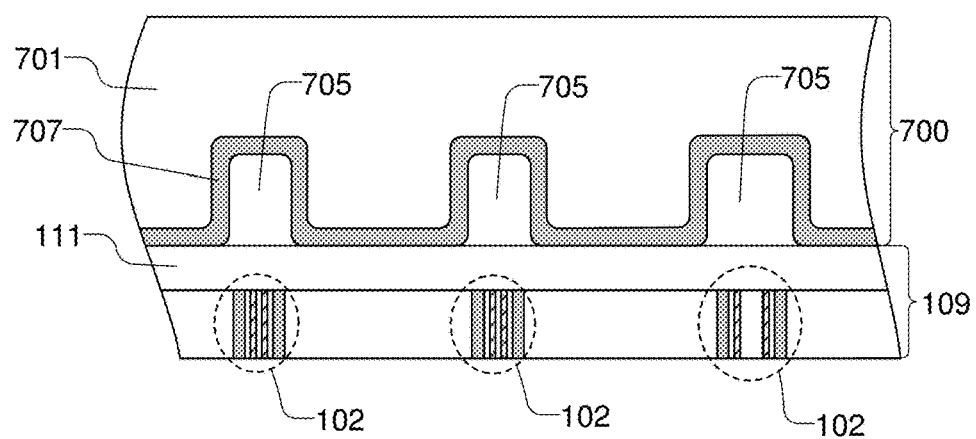
FIG. 8F shows the vertical cross-section schematic of the portion of the handle-integrated composite wafer assembly of FIG. 8D with the WSS and temporary adhesive removed, in accordance with some embodiments.

FIG. 8D shows a vertical cross-section schematic of a portion of the handle-integrated composite wafer assembly 800, referenced as View B-B in FIG. 8C, in accordance with some embodiments. FIG. 8E shows a close-up view of the portion 801 of FIG. 8D, in accordance with some embodiments. As shown in FIG. 8E, the cavity 705 in the replacement handle 700 is substantially aligned with the photonic device 102. In the example of FIG. 8E, the photonic device includes the resonator device 200, which includes the optical cavity 201 and the thermal tuning device 209, e.g., heater. The presence of the cavity 705 above the photonic device 102 serves to increase the thermal resistance $R_{t,PD}$ between the photonic device 102 and the ambient environment. In some embodiments, a size 803 of the open region within the cavity 705, as measured in the direction substantially parallel to the outer surface of the BOX layer (111), is larger than a size of the photonic device 102, as measured in the same direction, such that the cavity 705 is sized to encompass the photonic device 102. The open region of the cavity 705 has a size 805 measured in the direction substantially perpendicular to the outer surface of the BOX layer (111). The size 805 is referred to as the open depth of the cavity 705. The size of the cavity 705 (both the horizontal size 805 and the open depth 805) affect the wavelength tuning range 301 of the resonator device 200, because the size of the cavity 705 affects the thermal resistance $R_{t,PD}$ between the resonator device 200 and the ambient environment. Also, the size 803 of the cavity is limited so as to provide a local increase in the thermal resistance $R_{t,PD}$ between the resonator device 200 and the ambient environment without substantially increasing the thermal resistance $R_{t,ED}$ between neighboring electronic devices 403 and the ambient environment. After the replacement handle wafer 700 is bonded to the modified composite wafer assembly 600, the WSS 503 and temporary adhesive 501 can be removed. FIG. 8F shows the vertical cross-section schematic of the portion of the handle-integrated composite wafer assembly 800 of FIG. 8D with the WSS 503 and temporary adhesive 501 removed, in accordance with some embodiments.

In accordance with the foregoing, the handle-integrated composite wafer assembly 800 includes a device wafer 100 including a device layer formed on a buried oxide layer. The device layer includes an optical resonator structure, such as the resonator device 200. The handle-integrated composite wafer assembly 800 also includes a handle wafer 700 that includes a base layer 701 and a layer of anti-reflective material 707 disposed on a top side of the base layer 701. The base layer 701 has a cavity 705 extending into the base layer 701 from the top side of the base layer 701. The cavity 705 has at least one side surface and a bottom surface. The layer of anti-reflective material 707 is substantially conformally disposed within the cavity 705 on the at least one side surface of the cavity 705 and on the bottom surface of the cavity 705. The handle wafer 700 is attached to the device wafer 100 with the layer of anti-reflective material 707 affixed to the buried oxide layer and with the cavity 705 substantially aligned with the optical resonator structure in the device layer.

In some embodiments, the cavity 705 is sized to encompass the optical resonator structure. In some embodiments, the optical resonator structure has an associated thermal tuning device. In some embodiments, the anti-reflective material 707 has a refractive index with a range extending from about 1.7 to about 3.6. In some embodiments, the layer of anti-reflective material 707 has a thickness within a range extending from about 100 nanometers to about 500 nanometers. In some embodiments, the cavity 705 has a depth within a range extending from about 100 micrometers to about 1000 micrometers, with the depth of the cavity 705 being less than a thickness of the base layer 701.

Figure 9A:
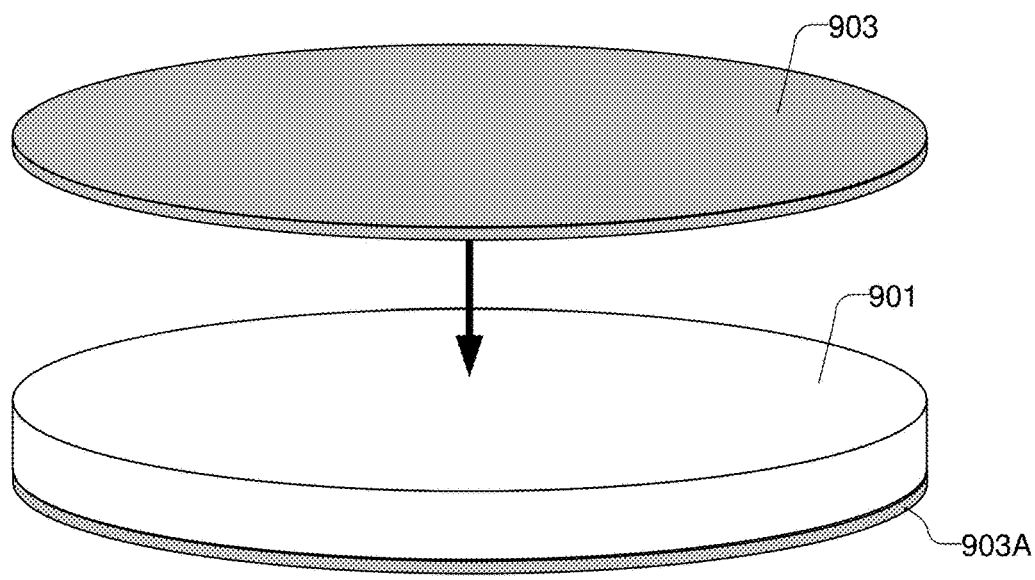
FIG. 9A shows a perspective view of an exploded arrangement for disposing a layer of anti-reflective material on a top side of a base layer as part of forming the replacement handle wafer, in accordance with some embodiments

In some embodiments, instead of the using the replacement handle wafer 700 that has the cavities patterned into the base layer 701, a replacement handle wafer 900 is used that includes openings in a patterned layer of spacing material to locally increase the thermal resistance $R_{t,PD}$ for photonic devices 102 on the device wafer 100. FIGS. 9A through 9E show how the replacement handle wafer 900 is formed. FIG. 9A shows a perspective view of an exploded arrangement for disposing a layer of anti-reflective material 903 on a top side of a base layer 901 as part of forming the replacement handle wafer 900, in accordance with some embodiments. In various embodiments, the base layer 901 is the same as the base layer 701 of the replacement handle wafer 700. In some embodiments the base layer 901 is a silicon wafer. In various embodiments, the layer of anti-reflective material 903 is composed and formed in the same way as previously described for the layer of anti-reflective material 707 of the replacement handle wafer 700. In some embodiments, the base layer 901 has a substantially planar surface on which the layer of anti-reflective material 903 is disposed. In some embodiments, the layer of anti-reflective material 903 has a substantially uniform thickness across the substantially planar surface of the base layer 901. In some embodiments, a thickness of the layer of anti-reflective material 903 is within a range extending from about 100 nanometers to about 500 nanometers. In some embodiments, the layer of anti-reflective material 903 has a refractive index with a range extending from about 1.7 to about 3.6. In some embodiments, the layer of anti-reflective material 903 also functions as a barrier to prevent moisture and/or oxygen from diffusing into the die 101 after the replacement handle wafer 900 is attached to the device wafer 100. In some embodiments, the layer of anti-reflective material 903 is formed by physical vapor deposition and/or chemical vapor deposition, but it should be understood that other thin film deposition technologies can also be used to form the layer of anti-reflective material 903, such as solution-based thin film deposition technologies, among others.

Also, in some embodiments, a layer of anti-reflective material 903A is optionally disposed on a bottom side of the base layer 901. In some embodiments, the layer of anti-reflective material 903A on the bottom side of the base layer 901 is composed and formed in the same manner as the layer of anti-reflective material 903 on the top side of the base layer 901. In some embodiments, however, the layer of anti-reflective material 903A on the bottom side of the base layer 901 is composed and/or formed in a different manner than the layer of anti-reflective material 903 on the top side of the base layer 901. For ease of description the replacement handle wafer 900 is depicted in the figures as having the layer of anti-reflective material 903 on the top side of the base layer 901, without having the layer of anti-reflective material 903A on the bottom side of the base layer 901.

Figure 9B:
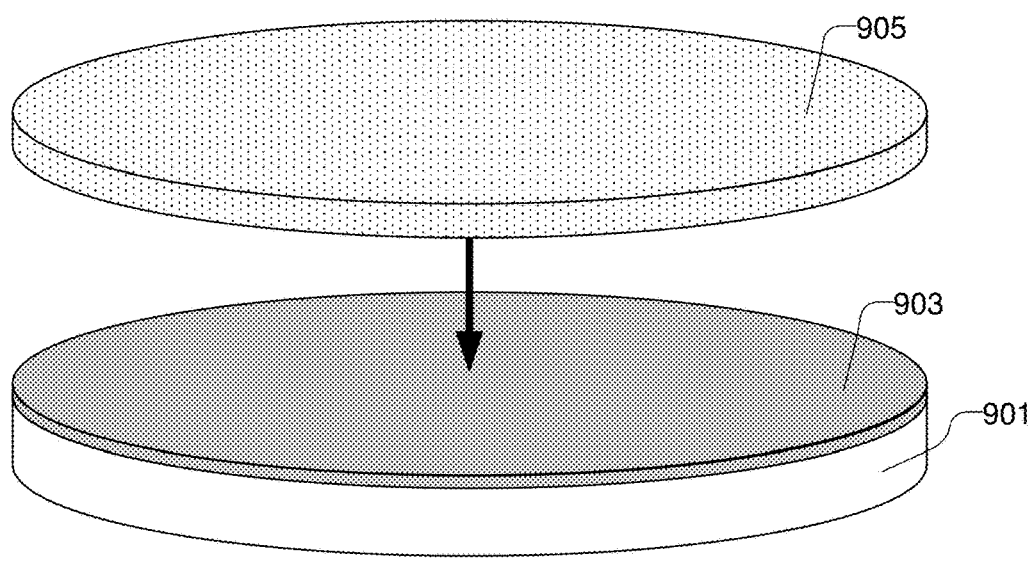
FIG. 9B shows a perspective view of an exploded arrangement for disposing a layer of spacing material on the layer of anti-reflective material as part of forming the replacement handle wafer, in accordance with some embodiments.

FIG. 9B shows a perspective view of an exploded arrangement for disposing a layer of spacing material 905 on the layer of anti-reflective material 903 as part of forming the replacement handle wafer 900, in accordance with some embodiments. A thickness of the layer of spacing material 905 determines the thickness of the air regions that will be used to locally increase the thermal resistance $R_{t,PD}$ for the photonic devices 102 formed in the device wafer 100. In some embodiments, the layer of spacing material 905 has a thickness within a range extending from about 100 micrometers to about 1000 micrometers. In some embodiments, the layer of spacing material 905 has a substantially uniform thickness across the base layer 901. In some embodiments, the layer of spacing material 905 is formed of silicon dioxide. However, in other embodiments, the layer of spacing material 905 is formed of one or more materials other than silicon dioxide, such as silicon nitride.

Figure 9C:
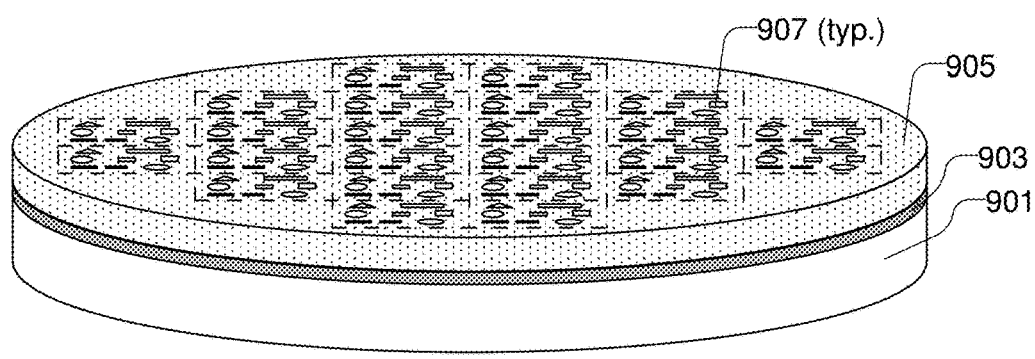
FIG. 9C shows the replacement wafer handle with the layer of spacing material patterned to include openings, in accordance with some embodiments.
Figure 9D:
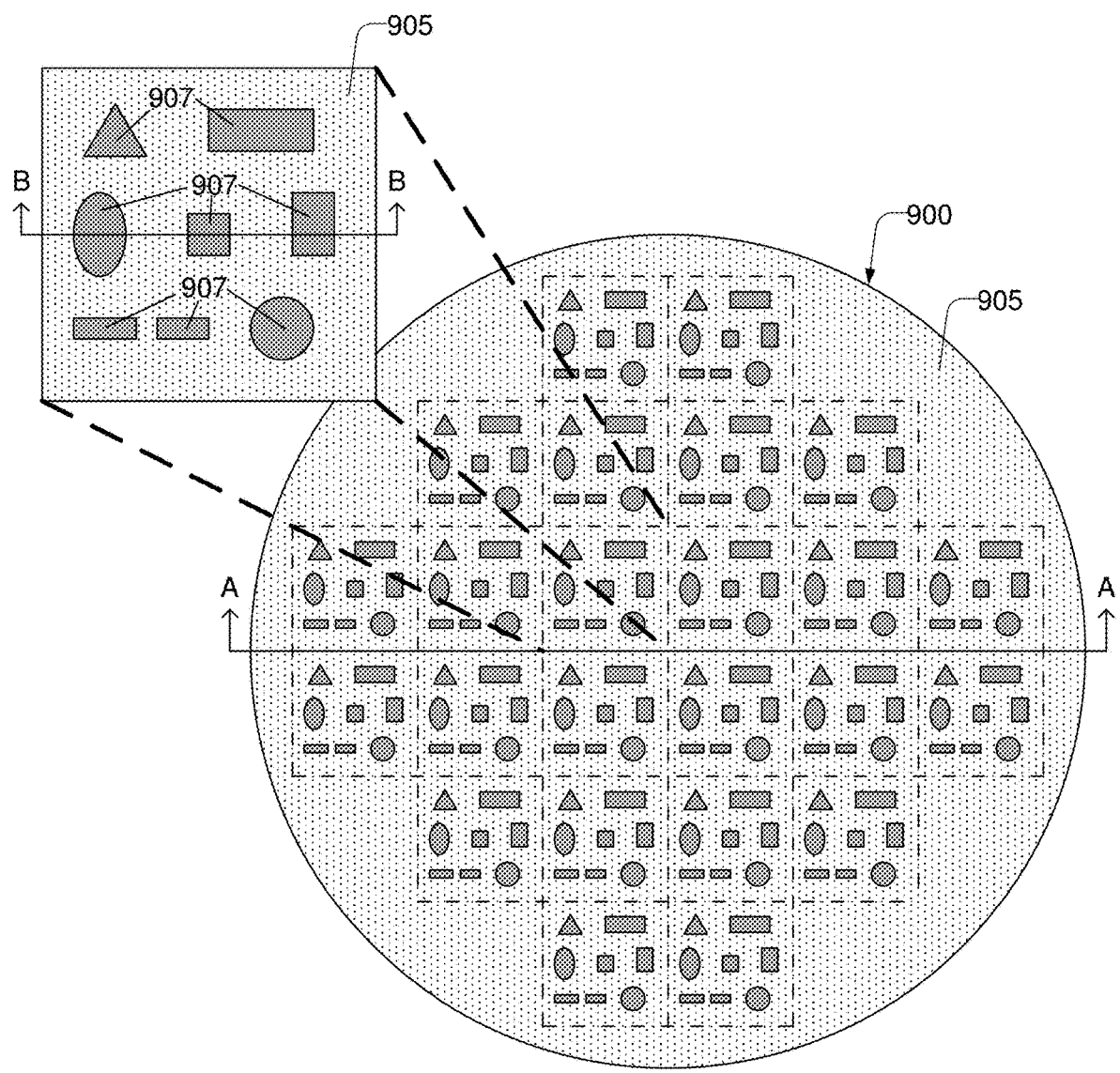
FIG. 9D shows a top view of the replacement wafer handle after patterning of the layer of spacing material, in accordance with some embodiments.
Figure 9E:
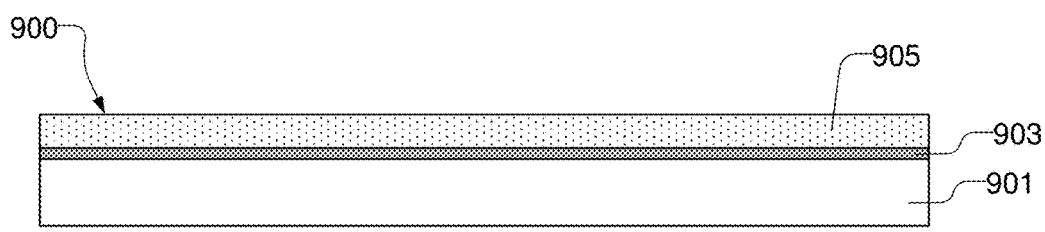
FIG. 9E shows a vertical cross-section view of the replacement wafer handle, referenced as View A-A in FIG. 9D, in accordance with some embodiments.
Figure 9F:
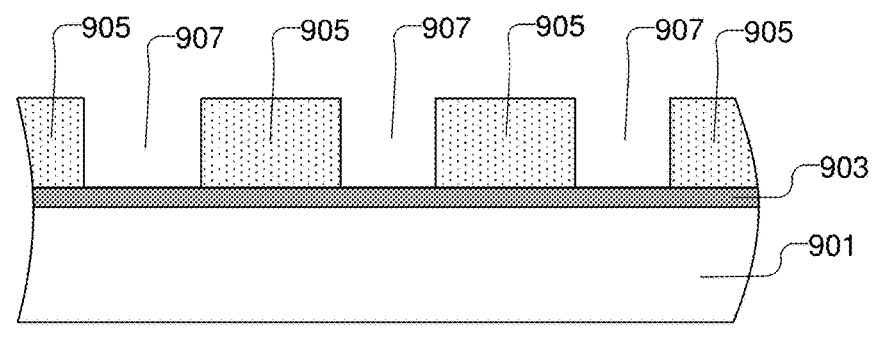
FIG. 9F shows a vertical cross-section through a portion of the replacement handle wafer, referenced as View B-B in FIG. 9D, in accordance with some embodiments.

FIG. 9C shows the replacement wafer handle 900 with the layer of spacing material 905 patterned to include openings 907, in accordance with some embodiments. FIG. 9D shows a top view of the replacement wafer handle 900 after patterning of the layer of spacing material 905, in accordance with some embodiments. FIG. 9E shows a vertical cross-section view of the replacement wafer handle 900, referenced as View A-A in FIG. 9D, in accordance with some embodiments. FIG. 9F shows a vertical cross-section through a portion of the replacement handle wafer 900, referenced as View B-B in FIG. 9D, in accordance with some embodiments. The openings 907 are distributed, sized, and formed to function in the same manner as the previously described cavities 705. The layer of anti-reflective material 903 is exposed at the bottom of the openings 907 formed through the layer of spacing material 905, with the spacing material exposed on the sidewall(s) of the openings 907.

The openings 907 are positioned and sized so that the openings 907 will overlie the photonic devices 102 in the device wafer 100 when the replacement handle wafer 900 is attached to the modified composite wafer assembly 600. In this manner, the openings 907 form respective regions of air above the photonic devices 102 within the die 101, which serves to increase the thermal resistance $R_{t,PD}$ associated with the photonic devices 102, thereby improving thermal control and power efficiency of the photonic devices 102. Each of the openings 907 can have essentially any size and shape, such as circular, rectangular, and/or triangular, among others, as needed to enable a perimeter of a given opening 907 to encompass a perimeter of a corresponding photonic device 102. In some embodiments, a given opening 907 is sized to encompass a corresponding optical resonator structure, e.g., resonator device 200, in the die 101. In some embodiments, the openings 907 are formed using standard photolithography processes known in the art of semiconductor fabrication. The photolithography processes are specified to define each dimension of the openings 907, such as lateral dimensions and vertical/depth dimensions. In some embodiments, the openings 907 are formed completely through the thickness of the layer of spacing material 905. In some embodiments, the layer of anti-reflective material 903 provides an etch stop for the etching process used to form the openings 907.

Figure 10A:
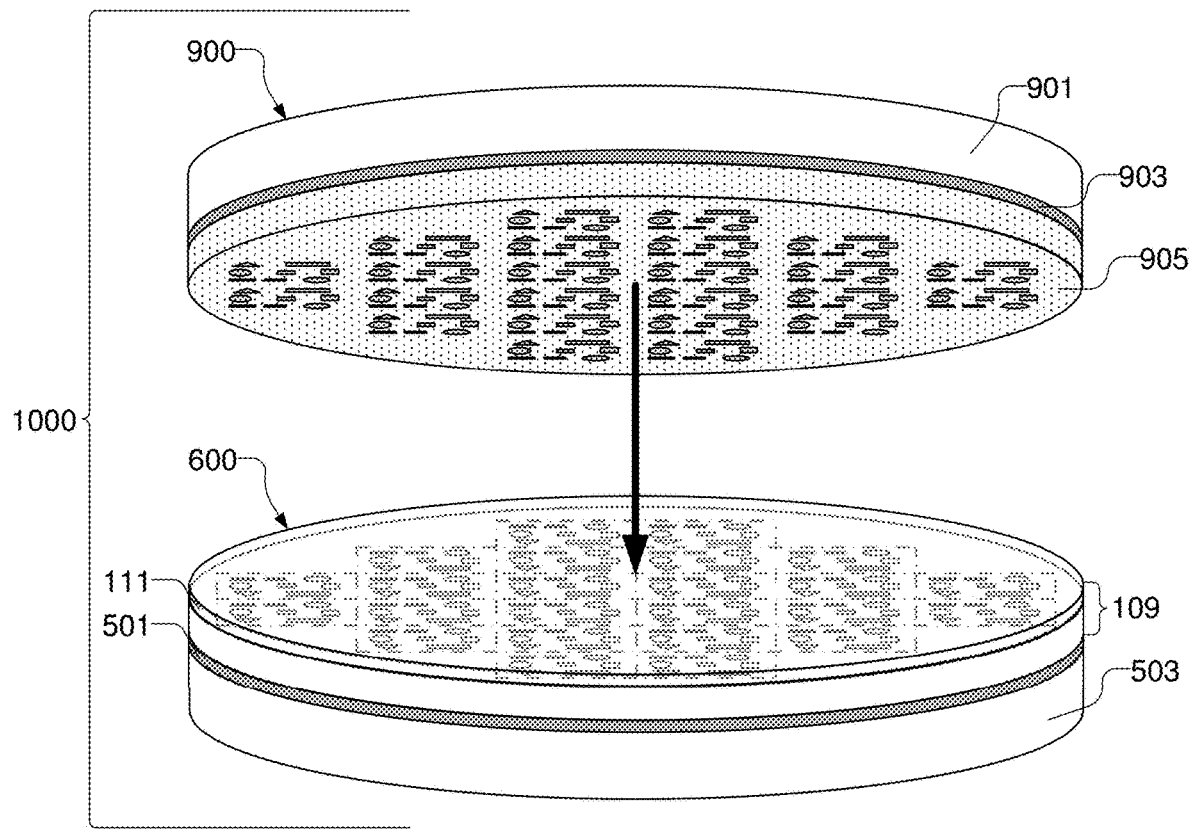
FIG. 10A shows a perspective view of an exploded arrangement for securing/bonding the replacement handle wafer to the modified composite wafer assembly to form a handle-integrated composite wafer assembly, in accordance with some embodiments.
Figure 10B:
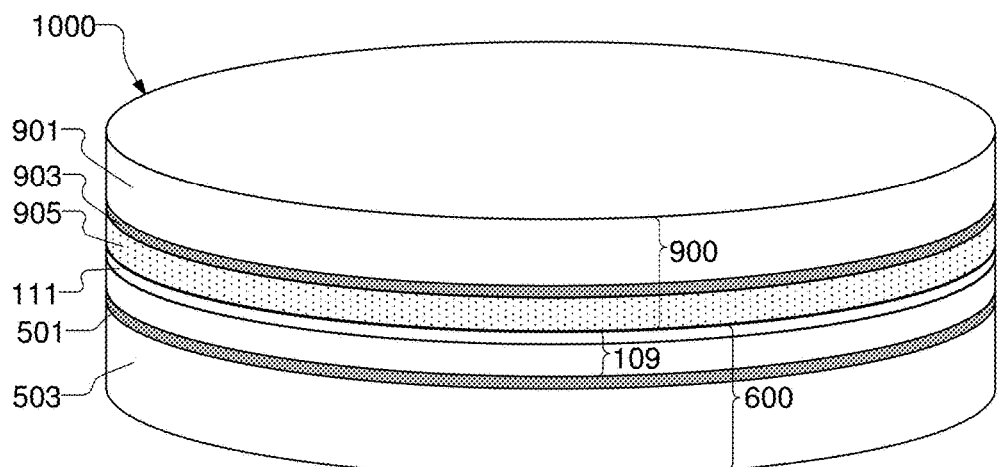
FIG. 10B shows a perspective view of the handle-integrated composite wafer assembly in assembled form, in accordance with some embodiments.
Figure 10C:
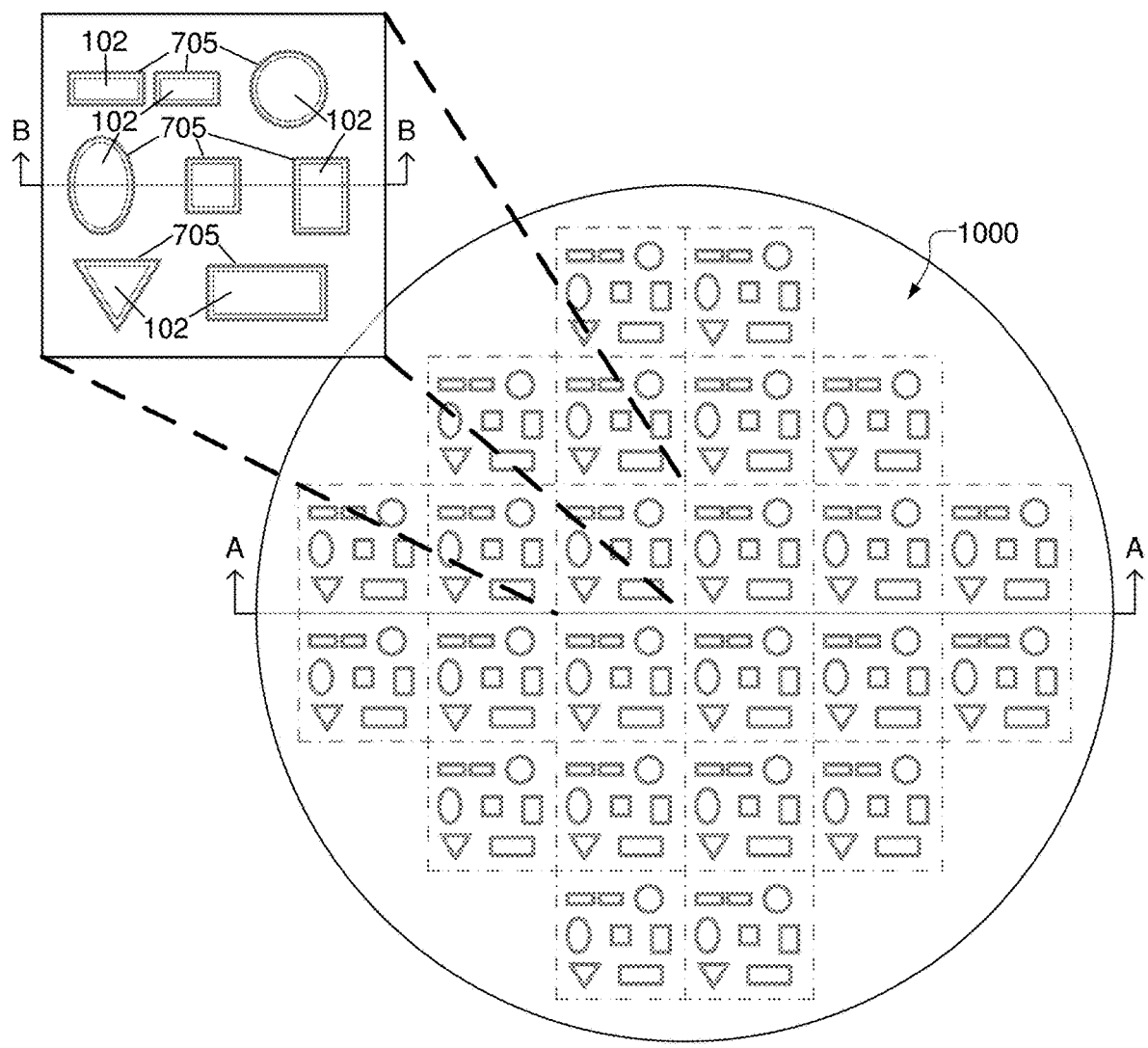
FIG. 10C shows a top view of the handle-integrated composite wafer assembly, in accordance with some embodiments.

FIG. 10A shows a perspective view of an exploded arrangement for securing/bonding the replacement handle wafer 900 to the modified composite wafer assembly 600 to form a handle-integrated composite wafer assembly 1000, in accordance with some embodiments. FIG. 10B shows a perspective view of the handle-integrated composite wafer assembly 1000 in assembled form, in accordance with some embodiments. FIG. 10C shows a top view of the handle-integrated composite wafer assembly 1000, in accordance with some embodiments. The replacement handle wafer 900 is shown in a transparent manner in FIG. 10C to reveal the spatial relationship between the openings 907 and the photonic devices 102. To form the handle-integrated composite wafer assembly 1000, the top surface of the replacement handle wafer 900 into which the openings 907 are formed (the top surface of the layer of spacing material 905) is permanently bonded to the surface of the modified composite wafer assembly 600 (that was exposed by removing the base layer 107 to the BOX material). Various wafer bonding methods can be used to permanently bond the replacement handle wafer 900 to the modified composite wafer assembly 600. For example, fusion bonding can be used for bonding silicon to silicon, or glass to glass, or polymethylmethacrylate (PMMA) to PMMA, etc. Anodic bonding can be used for bonding silicon to glass. Also, in some embodiments, an adhesive can be used to permanently bond the replacement handle wafer 900 to the modified composite wafer assembly 600. In some embodiments in which the layer of spacing material 905 is silicon dioxide and the wafer 100 is a silicon-on-insulator wafer, the layer of spacing material 905 of the replacement handle wafer 900 is fusion bonded to the modified composite wafer assembly 600.

Figure 10D:
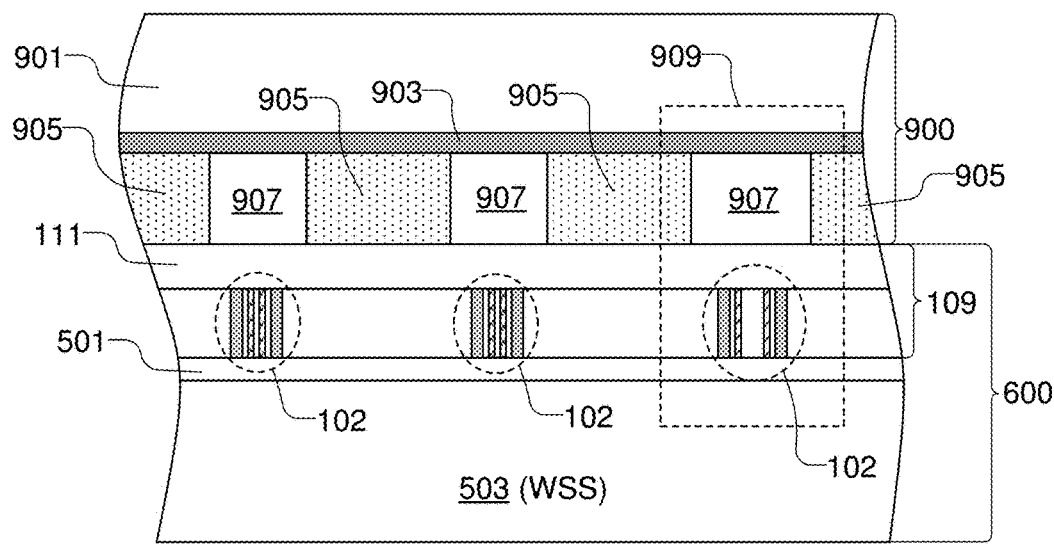
FIG. 10D shows a vertical cross-section schematic of a portion of the handle-integrated composite wafer assembly, referenced as View B-B in FIG. 10C, in accordance with some embodiments.
Figure 10E:
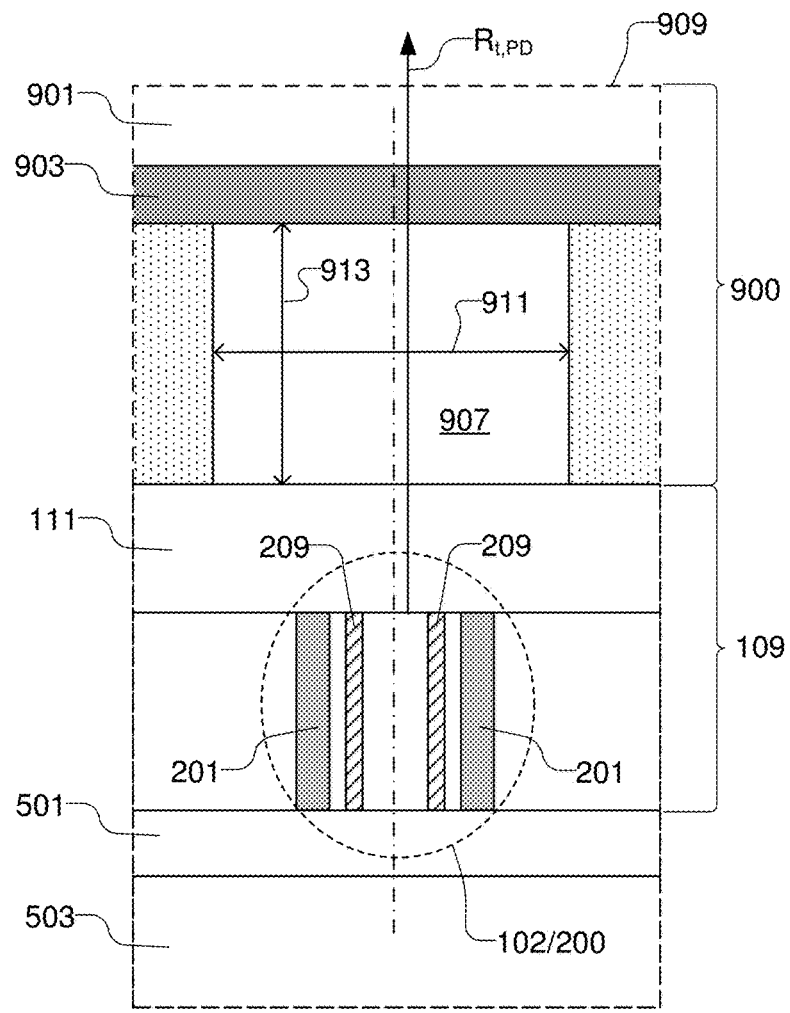
FIG. 10E shows a close-up view of the portion of FIG. 10D, in accordance with some embodiments.
Figure 10F:
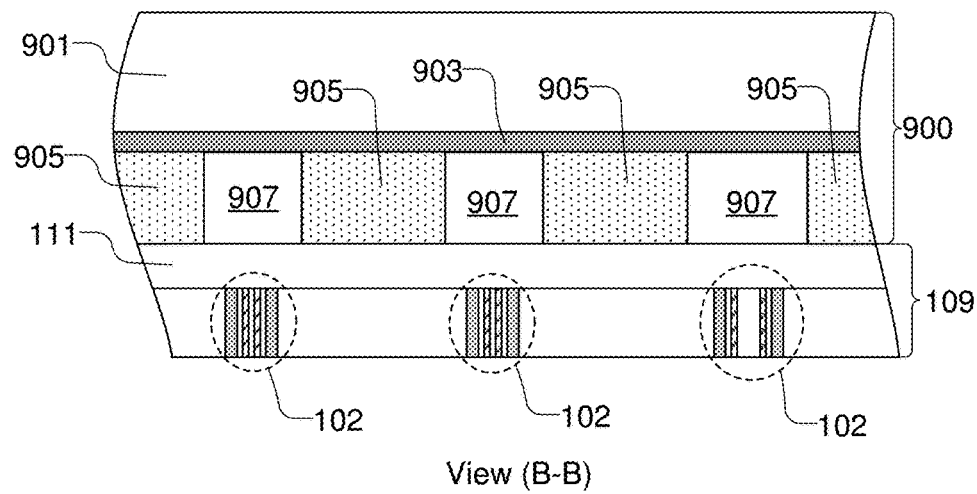
FIG. 10F shows the vertical cross-section schematic of the portion of the handle-integrated composite wafer assembly of FIG. 10D with the WSS and temporary adhesive removed, in accordance with some embodiments.

FIG. 10D shows a vertical cross-section schematic of a portion of the handle-integrated composite wafer assembly 1000, referenced as View B-B in FIG. 10C, in accordance with some embodiments. FIG. 10E shows a close-up view of the portion 909 of FIG. 10D, in accordance with some embodiments. As shown in FIG. 10E, the opening 907 in the replacement handle wafer 900 is substantially aligned with the photonic device 102. In the example of FIG. 10E, the photonic device includes the resonator device 200, which includes the optical cavity 201 and the thermal tuning device 209, e.g., heater. The presence of the opening 907 above the photonic device 102 serves to increase the thermal resistance $R_{t,PD}$ between the photonic device 102 and the ambient environment. In some embodiments, a size 911 of the opening 907, as measured in the direction substantially parallel to the outer surface of the BOX layer (111), is larger than a size of the photonic device 102, as measured in the same direction, such that the opening 907 is sized to encompass the photonic device 102. The opening 907 has a size 913 measured in the direction substantially perpendicular to the outer surface of the BOX layer (111). The size 913 is referred to as the depth of the opening 907. In some embodiments, the size 913 is substantially equal to or greater that the thickness of the layer of spacing material 905. The size of the opening 907 (both the horizontal size 911 and the depth 913) affect the wavelength tuning range 301 of the resonator device 200, because the size of the opening 907 affects the thermal resistance $R_{t,PD}$ between the resonator device 200 and the ambient environment. Also, the size 911 of the opening 907 is limited so as to provide a local increase in the thermal resistance $R_{t,PD}$ between the resonator device 200 and the ambient environment without substantially increasing the thermal resistance $R_{t,ED}$ between neighboring electronic devices 403 and the ambient environment. After the replacement handle wafer 900 is bonded to the modified composite wafer assembly 600, the WSS 503 and temporary adhesive 501 can be removed. FIG. 10F shows the vertical cross-section schematic of the portion of the handle-integrated composite wafer assembly 1000 of FIG. 10D with the WSS 503 and temporary adhesive 501 removed, in accordance with some embodiments.

In accordance with the foregoing, a handle-integrated composite wafer assembly 1000 is disclosed as including a device wafer 100 and a replacement handle wafer 900 attached to the device wafer 100. The device wafer 100 includes a device layer formed on a buried oxide layer. The device layer includes an optical resonator structure, such as the resonator device 200. The replacement handle wafer 900 includes a base layer 901 and a layer of anti-reflective material 903 disposed on the base layer 901. The replacement handle wafer 900 includes a layer of patterned spacing material 905 formed on the layer of anti-reflective material 903. The layer of patterned spacing material 905 is formed to include an opening 907 that exposes a portion of the layer of anti-reflective material 903. The replacement handle wafer 900 is attached to the device wafer 100 with the layer of patterned spacing material 905 affixed to the buried oxide layer, and with the opening 907 in the layer of patterned spacing material 905 substantially aligned with the optical resonator structure 200 in the device layer.

In some embodiments, the opening 907 in the layer of patterned spacing material 905 is sized to encompass the optical resonator structure 200. In some embodiments, the optical resonator structure 200 has an associated thermal tuning device 209. In some embodiments, the anti-reflective material 903 has a refractive index with a range extending from about 1.7 to about 3.6. In some embodiments, a thickness of the layer of anti-reflective material 903 is within a range extending from about 100 nanometers to about 500 nanometers. In some embodiments, the layer of patterned spacing material 905 has a thickness within a range extending from about 100 micrometers to about 1000 micrometers.

Figure 11:
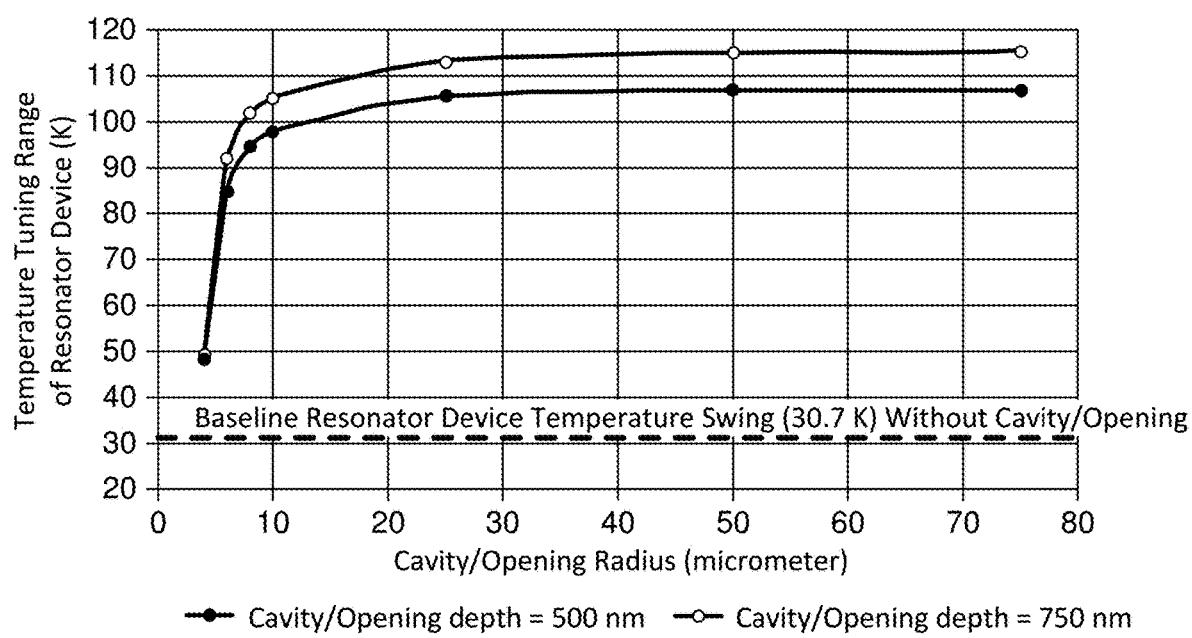
FIG. 11 shows a plot of thermal simulation results for the resonator device temperature tuning range as a function of cavity/opening geometry, in accordance with some embodiments.

FIG. 11 shows a plot of thermal simulation results for the resonator device 200 temperature tuning range as a function of cavity 705/opening 907 geometry, in accordance with some embodiments. More specifically, FIG. 11 depicts the thermal simulation results for a specific implementation of the resonator device 200 with a small-diameter optical cavity 201 and heater 209 (both with diameters less than 20 micrometers), and with the radius and depth of the cavity 705/opening 907 above the resonator device 200 varied to determine their impact on the resonator device 200 temperature tuning range (TTR). The size of the cavity 705/opening 907 affects the TTR of the resonator device 200 because it alters the thermal resistance $R_{t,PD}$ between the resonator device 200 and ambient. The thermal simulation results of FIG. 11 assume that the heater 209 dissipates 6 milliWatts of heat. At this heater 209 power, without the cavity 705/opening 907, the TTR of the resonator device 200 is approximately 30.7 Kelvin. With the addition of the cavity 705/opening 907, even with the cavity 705/opening 907 having a radius as small as 10 micrometers and a vertical/depth dimension as small as 500 micrometers, the TTR of the resonator device 200 increases significantly due to the extremely low thermal conductivity of the air in the cavity 705/opening 907, which reduces heat transfer from the resonator device 200 to ambient.

Figure 12A:
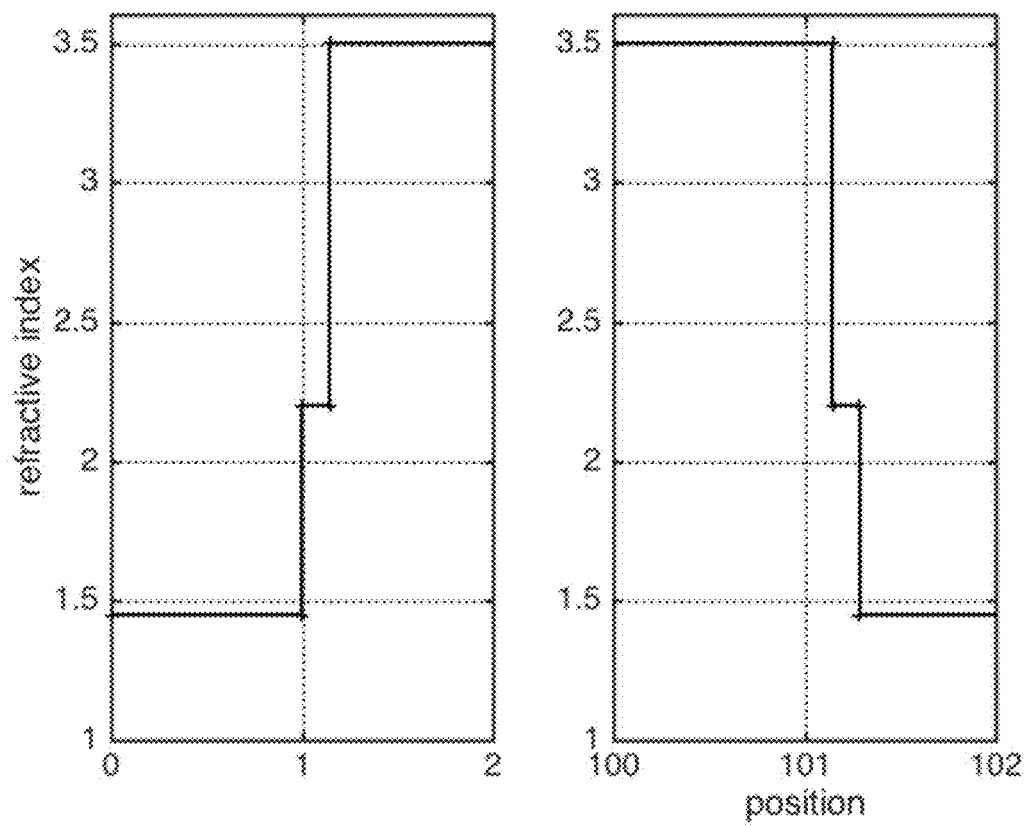
FIG. 12A shows an example refractive index configuration of the replacement handle wafer with the layer of anti-reflective material deposited on one or both of the front side and back side of the replacement handle wafer, in accordance with some embodiments.

FIG. 12A shows an example refractive index configuration of the replacement handle wafer 700/900 with the layer of anti-reflective material 707/903 deposited on one or both of the front side and back side of the replacement handle wafer 700/900, in accordance with some embodiments. The refractive index configuration of FIG. 12A corresponds to an example embodiment in which the replacement handle wafer 700/900 is defined as a slab of silicon, and in which the layer anti-reflective material 707/903 deposited on the front side of the replacement handle wafer 700/900 is defined as a single layer of anti-reflective material, and in which the layer of anti-reflective material 707A/903A deposited on the back side of the replacement handle wafer 700/900 is defined as a single layer of anti-reflective material. The refractive index is assumed to be 1.45 outside of the layer of anti-reflective material 707A/903A on a light input side of the replacement handle wafer 700/900 where an input light beam is incident. The refractive index is assumed to be 1.45 outside of the layer of anti-reflective material 707/903 on an output side of the replacement handle wafer 700/900 from which output light would exit the replacement handle wafer 700/900. The refractive index of the anti-reflective material is 2.2 in the example of FIG. 12A. However, it should be understood that the refractive index of the anti-reflective material can be different than 2.2 in other embodiments.

Figure 12B:
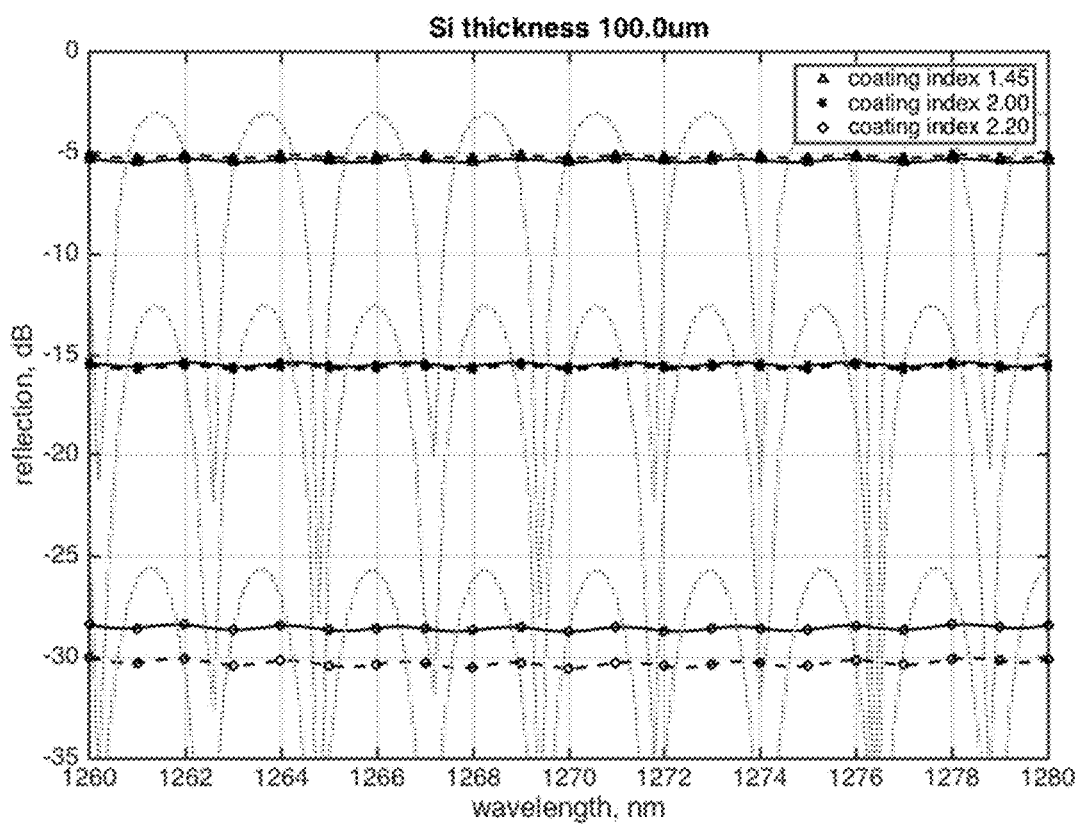
FIG. 12B shows simulated plots of light reflection as a function of light wavelength for the configuration of FIG. 12A for various refractive index values of the anti-reflective material, in accordance with some embodiments.

FIG. 12B shows simulated plots of light reflection as a function of light wavelength for the configuration of FIG. 12A for various refractive index values of the anti-reflective material, in accordance with some embodiments. For a silicon slab with two reflective interfaces (such as in the refractive index configuration of FIG. 12A), reflected components from each reflective interface interfere with each other. If the input light is a plane-wave input light with a well-defined incident angle, the light reflection has large wavelength dependence, as shown by the dotted curves in FIG. 12B. The reflected power for a silicon slab with two reflective interfaces can be up to about four times greater than for the silicon slab with a single reflective interface, or can be zero, depending on the phase between reflected components from the first and second interfaces.

If the silicon slab of the replacement handle wafer 700/900 is relatively thick (e.g., 100 micrometers), the phase between reflected components from the first and second interfaces varies substantially with the incident angle of the plane-wave input light. Since a light beam with finite diameter (e.g., with 9.4 micrometer mode field diameter (MFD)) includes light components with a range of incident angles, the reflection averaged over all incident angles in the light beam tends to be averaged over all phases, and thus has a much smoother dependence on light wavelength. FIG. 12B shows smoothed reflection curves for TM polarization, as indicated by the solid lines. FIG. 12B also shows smoothed reflection curves for TE polarization, as indicated by dashed lines. The smoothed reflection curves for TM polarization and TE polarization provide an estimate of light reflection for a realistic input light beam. FIG. 12B shows reflection curves for three different anti-reflective material refractive index values of 1.45, 2.00, and 2.20. The reflection curves of FIG. 12B indicate that selection of the anti-reflective material with regard to refractive index has a significant impact reflection performance. A refractive index of the anti-reflective material in a range extending from about 2.0 to about 2.4 provides some reduction of light reflections compared with no coating, but a more optimal choice of anti-reflective material with regard to refractive index can be used to achieve better light reflection performance. Several anti-reflective materials are available in the refractive index range extending from about 1.7 to about 3.6, including silicon nitride ($Si_3N_4$) having a refractive index of about 2.00, yttrium oxide ($Y_2O_3$) having a refractive index of about 1.9, tantalum oxide ($Ta_2O_5$) having a refractive index of about 2.07, niobium pentoxide ($Nb_2O_5$) having a refractive index of about 2.24, zinc sulfide (ZnS) having a refractive index of about 2.3, as well as materials where the refractive index can be tuned with process conditions such as silicon oxynitride ($SiOxNy$), aluminum oxide ($Al2O3$) having a refractive index of about 1.75, silicon (Si) having a refractive index of about 3.6, among others. The anti-reflective material layers used in the simulations of FIG. 12B have a thickness within a range extending from about 140 nanometers to about 160 nanometers.

Figure 13A:
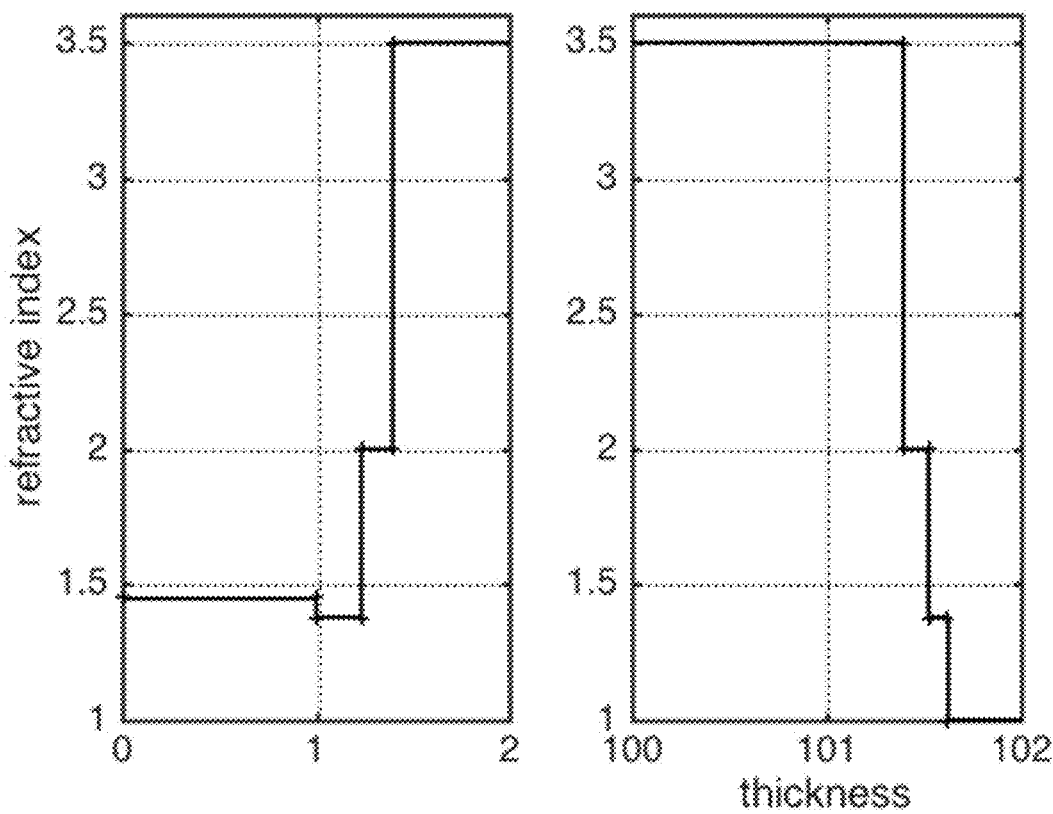
FIG. 13A shows a refractive index configuration of the replacement handle wafer with a two-layer anti-reflective material deposited on the front side of the replacement handle wafer, and with a two-layer anti-reflective material deposited on the back side of the replacement handle wafer, in accordance with some embodiments.

FIG. 13A shows a refractive index configuration of the replacement handle wafer 700/900 with a two-layer anti-reflective material 707/903 deposited on the front side of the replacement handle wafer 700/900, and with a two-layer anti-reflective material 707A/903A deposited on the back side of the replacement handle wafer 700/900, in accordance with some embodiments. The light "input" and "output" regions of the replacement handle wafer 700/900 may not have the refractive index of 1.45 in some cases. FIG. 13A shows an example case in which the light input region has a refractive index of 1.45, and the light output region is a cavity 705/opening 907 filled with air having a refractive index of 1.0. The anti-reflective material configurations of FIG. 13A are defined for low-reflection light propagation from the light input region (refractive index of 1.45), through a slab of silicon (refractive index of 3.5), and into the air cavity 705/opening 907 of the light output region (refractive index of 1.0). FIG. 13A shows that the two-layer anti-reflective material 707A/903A disposed on the replacement handle wafer 700/900 at the light input region includes an outer layer of magnesium fluoride ($MgF_2$) having a thickness of about 234 nanometers and an inner layer of silicon nitride ($Si_3N_4$) having a thickness of about 161 nanometers. FIG. 13A also shows that the two-layer anti-reflective material 707/903 disposed on the replacement handle wafer 700/900 at the light output region includes an inner layer of silicon nitride ($Si_3N_4$) having a thickness of about 128 nanometers and an outer layer of magnesium fluoride ($MgF_2$) having a thickness of about 102 nanometers.

Figure 13B:
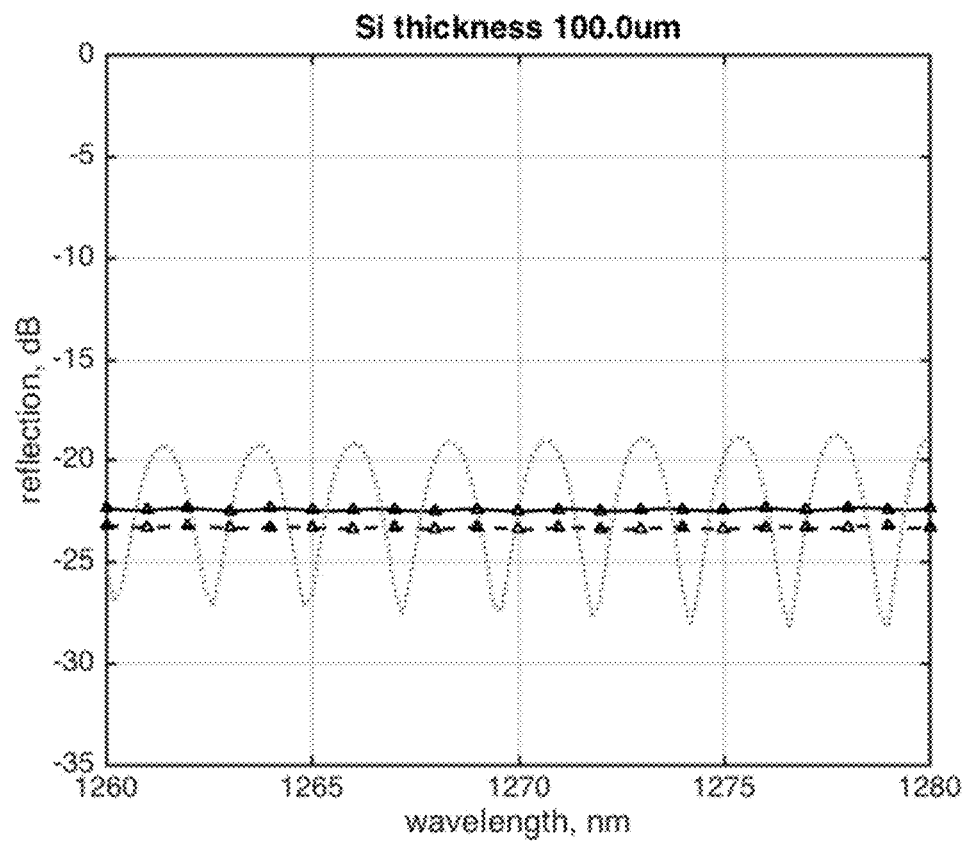
FIG. 13B shows simulated plots of light reflection as a function of light wavelength for the configuration of FIG. 13A, in accordance with some embodiments.

FIG. 13B shows simulated plots of light reflection as a function of light wavelength for the configuration of FIG. 13A, in accordance with some embodiments. FIG. 13B shows that the light reflection is substantially suppressed by the anti-reflective material configuration of FIG. 13A. Based in part on the results of FIG. 13B, it is determined that the combination of silicon nitride ($Si_3N_4$) and magnesium fluoride ($MgF_2$) anti-reflective material layers with optimized thicknesses on each of the light input side and light output side of the replacement handle wafer 700/900 achieves lower light reflections than an anti-reflective material configuration that has a single layer of either magnesium fluoride ($MgF_2$) or silicon nitride ($Si_3N_4$).

Figure 14:
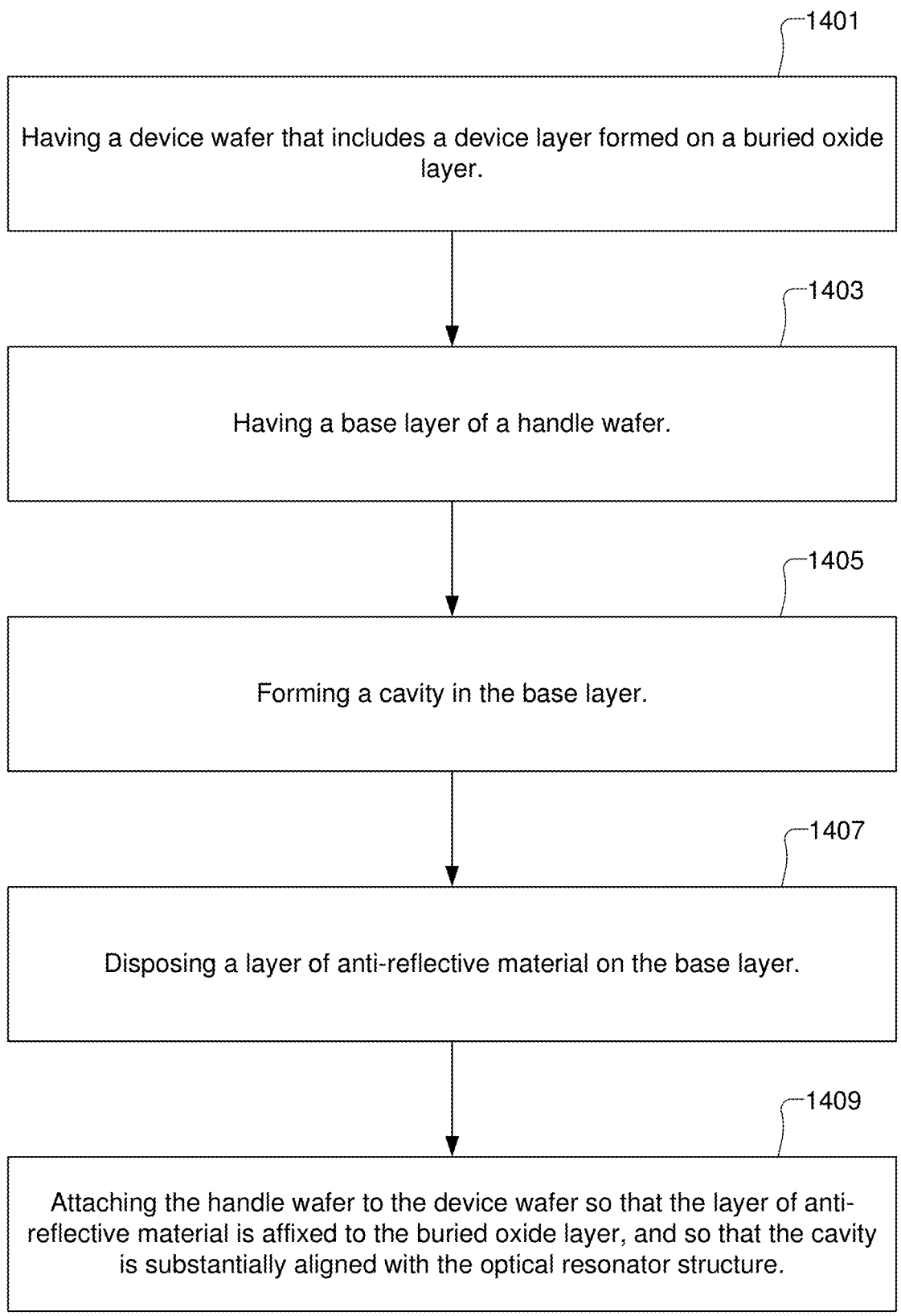
FIG. 14 shows a flowchart of a method for manufacturing a handle-integrated composite wafer assembly, in accordance with some embodiments.

FIG. 14 shows a flowchart of a method for manufacturing a handle-integrated composite wafer assembly, in accordance with some embodiments. The method includes an operation 1401 for having a device wafer that includes a device layer formed on a buried oxide layer. The device layer includes an optical resonator structure. The method also includes an operation 1403 for having a base layer of a handle wafer. The method also includes an operation 1405 for forming a cavity in the base layer. The cavity is positioned on the base layer to substantially align with the optical resonator structure when the handle wafer is attached to the device wafer. The cavity is formed to have at least one side surface and a bottom surface. In some embodiments, the operation 1405 includes performing a photolithography process to pattern a hole in a mask material over the base layer and performing an etching process to remove material from the base layer through the hole in the mask material to form the cavity. The method also includes an operation 1407 for disposing a layer of anti-reflective material on the base layer. The layer of anti-reflective material is substantially conformally disposed within the cavity on the at least one side surface of the cavity and on the bottom surface of the cavity. In some embodiments, the layer of anti-reflective material is disposed on the base layer using physical vapor deposition process or a chemical vapor deposition process. In some embodiments, the anti-reflective material has a refractive index with a range extending from about 1.7 to about 3.6. In some embodiments, the layer of anti-reflective material is disposed to have a thickness within a range extending from about 100 nanometers to about 500 nanometers. The method also includes an operation 1409 for attaching the handle wafer to the device wafer so that the layer of anti-reflective material is affixed to the buried oxide layer, and so that the cavity is substantially aligned with the optical resonator structure. In some embodiments, the cavity is sized to encompass the optical resonator structure. In some embodiments, the cavity is formed to have a depth within a range extending from about 100 micrometers to about 1000 micrometers and less than a thickness of the base layer.

Figure 15:
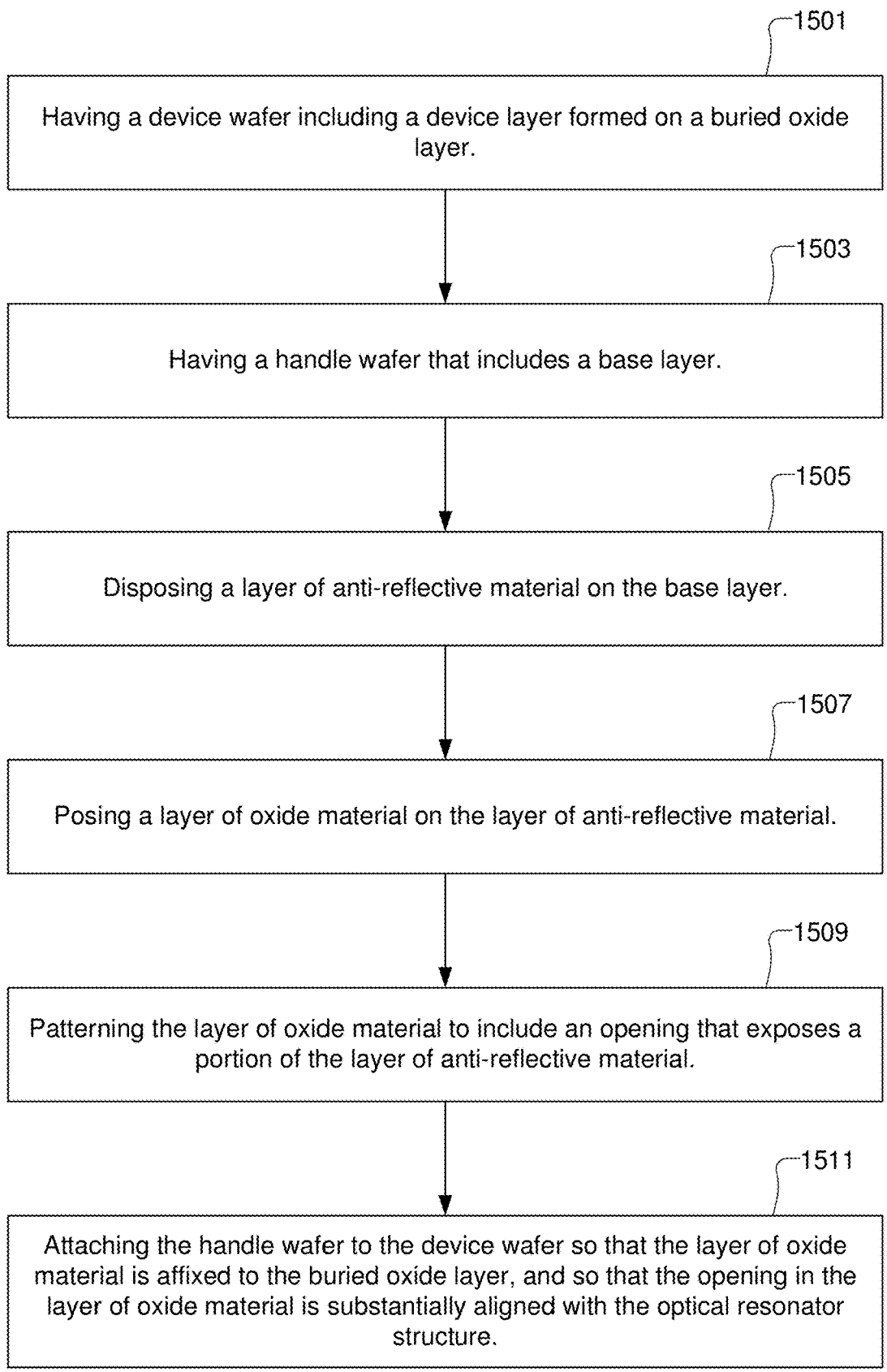
FIG. 15 shows a flowchart of a method for manufacturing a handle-integrated composite wafer assembly, in accordance with some embodiments.

FIG. 15 shows a flowchart of a method for manufacturing a handle-integrated composite wafer assembly, in accordance with some embodiments. The method includes an operation 1501 for having a device wafer including a device layer formed on a buried oxide layer. The device layer includes an optical resonator structure. The method also includes an operation 1503 for having a handle wafer that includes a base layer. The method also includes an operation 1505 for disposing a layer of anti-reflective material on the base layer. In some embodiments, the anti-reflective material has a refractive index with a range extending from about 1.7 to about 3.6. In some embodiments, the layer of anti-reflective material is disposed to have a thickness within a range extending from about 100 nanometers to about 500 nanometers. In some embodiments, the layer of anti-reflective material is disposed on the base layer using physical vapor deposition process or a chemical vapor deposition process. The method also includes an operation 1507 for disposing a layer of spacing material on the layer of anti-reflective material. In some embodiments, the layer of spacing material is disposed to have a thickness within a range extending from about 100 micrometers to about 1000 micrometers. The method also includes an operation 1509 for patterning the layer of spacing material to include an opening that exposes a portion of the layer of anti-reflective material. The opening is positioned to substantially align with the optical resonator structure when the handle wafer is attached to the silicon-on-insulator wafer. In some embodiments, the operation 1509 includes performing a photolithography process to pattern a hole in a mask material over the layer of spacing material, and performing an etching process to remove material from the layer of spacing material through the hole in the mask material to form the opening in the layer of spacing material. The method also includes an operation 1511 for attaching the handle wafer to the device wafer so that the layer of spacing material is affixed to the buried oxide layer, and so that the opening in the layer of spacing material is substantially aligned with the optical resonator structure. In some embodiments, the opening in the layer of spacing material is sized to encompass the optical resonator structure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiment(s), even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A handle-integrated composite wafer assembly, comprising:
   a device wafer including a device layer formed on a buried oxide layer, the device layer including an optical resonator structure; and
   a handle wafer including a base layer and a layer of anti-reflective material disposed on a top side of the base layer, the base layer having a cavity extending into the base layer from the top side of the base layer, the cavity having at least one side surface and a bottom surface, the layer of anti-reflective material substantially conformally disposed within the cavity on the at least one side surface of the cavity and on the bottom surface of the cavity,
   the handle wafer attached to the device wafer with the layer of anti-reflective material affixed to the buried oxide layer and with the cavity substantially aligned with the optical resonator structure in the device layer.

2. The handle-integrated composite wafer assembly as recited in claim 1, wherein the cavity is sized to encompass the optical resonator structure.

3. The handle-integrated composite wafer assembly as recited in claim 1, wherein the optical resonator structure has an associated thermal tuning device.

4. The handle-integrated composite wafer assembly as recited in claim 1, wherein the anti-reflective material has a refractive index with a range extending from about 1.7 to about 3.6.

5. The handle-integrated composite wafer assembly as recited in claim 1, wherein a thickness of the layer of anti-reflective material is within a range extending from about 100 nanometers to about 500 nanometers.

6. The handle-integrated composite wafer assembly as recited in claim 1, wherein the cavity has a depth within a range extending from about 100 micrometers to about 1000 micrometers, and wherein the depth of the cavity is less than a thickness of the base layer.

7. A method for manufacturing a handle-integrated composite wafer assembly, comprising:
   having a device wafer including a device layer formed on a buried oxide layer, the device layer including an optical resonator structure;
   having a base layer of a handle wafer;
   forming a cavity in the base layer, the cavity positioned on the base layer to substantially align with the optical resonator structure when the handle wafer is attached to the device wafer, the cavity formed to have at least one side surface and a bottom surface;
   disposing a layer of anti-reflective material on the base layer, the layer of anti-reflective material substantially conformally disposed within the cavity on the at least one side surface of the cavity and on the bottom surface of the cavity; and attaching the handle wafer to the device wafer so that the layer of anti-reflective material is affixed to the buried oxide layer, and so that the cavity is substantially aligned with the optical resonator structure.

8. The method as recited in claim 7, wherein forming the cavity in the base layer includes performing a photolithography process to pattern a hole in a mask material over the base layer, and performing an etching process to remove material from the base layer through the hole in the mask material to form the cavity.

9. The method as recited in claim 7, wherein the cavity is sized to encompass the optical resonator structure.

10. The method as recited in claim 7, wherein the cavity is formed to have a depth within a range extending from about 100 micrometers to about 1000 micrometers and less than a thickness of the base layer.

11. The method as recited in claim 7, wherein the layer of anti-reflective material is disposed on the base layer using physical vapor deposition process or a chemical vapor deposition process.

12. The method as recited in claim 7, wherein the anti-reflective material has a refractive index with a range extending from about 1.7 to about 3.6.

13. The method as recited in claim 7, wherein the layer of anti-reflective material is disposed to have a thickness within a range extending from about 100 nanometers to about 500 nanometers.

14. A handle-integrated composite wafer assembly, comprising:
a device wafer including a device layer formed on a buried oxide layer, the device layer including an optical resonator structure; and
a handle wafer including a base layer and a layer of anti-reflective material disposed on the base layer, the handle wafer including a layer of patterned spacing material formed on the layer of anti-reflective material, the layer of patterned spacing formed to include an opening that exposes a portion of the layer of anti-reflective material,
the handle wafer attached to the device wafer with the layer of patterned spacing material affixed to the buried oxide layer and with the opening in the layer of patterned spacing material substantially aligned with the optical resonator structure in the device layer.

15. The handle-integrated composite wafer assembly as recited in claim 14, wherein the opening in the layer of patterned spacing material is sized to encompass the optical resonator structure.

16. The handle-integrated composite wafer assembly as recited in claim 14, wherein the optical resonator structure has an associated thermal tuning device.

17. The handle-integrated composite wafer assembly as recited in claim 14, wherein the anti-reflective material has a refractive index with a range extending from about 1.7 to about 3.6.

18. The handle-integrated composite wafer assembly as recited in claim 14, wherein a thickness of the layer of anti-reflective material is within a range extending from about 100 nanometers to about 500 nanometers.

19. The handle-integrated composite wafer assembly as recited in claim 14, wherein the layer of patterned spacing material has a thickness within a range extending from about 100 micrometers to about 1000 micrometers.

20. A method for manufacturing a handle-integrated composite wafer assembly, comprising:
having a device wafer including a device layer formed on a buried oxide layer, the device layer including an optical resonator structure;
having a handle wafer that includes a base layer;
disposing a layer of anti-reflective material on the base layer;
disposing a layer of spacing material on the layer of anti-reflective material;
patterning the layer of spacing material to include an opening that exposes a portion of the layer of anti-reflective material, the opening positioned to substantially align with the optical resonator structure when the handle wafer is attached to the device wafer; and
attaching the handle wafer to the device wafer so that the layer of spacing material is affixed to the buried oxide layer, and so that the opening in the layer of spacing material is substantially aligned with the optical resonator structure.

21. The method as recited in claim 20, wherein patterning the layer of spacing material includes performing a photolithography process to pattern a hole in a mask material over the layer of spacing material, and performing an etching process to remove material from the layer of spacing material through the hole in the mask material to form the opening in the layer of spacing material.

22. The method as recited in claim 20, wherein the opening in the layer of spacing material is sized to encompass the optical resonator structure.

23. The method as recited in claim 20, wherein the layer of spacing material is disposed to have a thickness within a range extending from about 100 micrometers to about 1000 micrometers.

24. The method as recited in claim 20, wherein the layer of anti-reflective material is disposed on the base layer using physical vapor deposition process or a chemical vapor deposition process.

25. The method as recited in claim 20, wherein the anti-reflective material has a refractive index with a range extending from about 1.7 to about 3.6.

26. The method as recited in claim 20, wherein the layer of anti-reflective material is disposed to have a thickness within a range extending from about 100 nanometers to about 500 nanometers.

* * * * *